United States Patent
Mashiki et al.

(10) Patent No.: US 6,505,599 B1
(45) Date of Patent: Jan. 14, 2003

(54) COMBUSTION CONTROL APPARATUS AND METHOD FOR ENGINES

(75) Inventors: Zenichiro Mashiki, Nisshin (JP); Jun Maemura, Toyota (JP); Rihito Kaneko, Aichi-ken (JP); Masahide Nagano, Fujisawa (JP); Senji Kato, Aichi-ken (JP); Hiroyuki Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 09/656,159

(22) Filed: Sep. 6, 2000

(30) Foreign Application Priority Data

Sep. 10, 1999 (JP) .......................................... 11-257801
Apr. 21, 2000 (JP) ....................................... 2000-121424

(51) Int. Cl.⁷ .......................... F02D 41/02; F02D 45/00; F02M 25/08
(52) U.S. Cl. ..................... 123/295; 123/300; 123/430; 123/520
(58) Field of Search ................. 123/295, 430, 123/300, 305, 518, 520, 698

(56) References Cited

U.S. PATENT DOCUMENTS 6,012,435 A * 1/2000 Takahashi et al. .......... 123/698
6,176,217 B1 * 1/2001 Ohkuma et al. ............ 123/295
6,256,982 B1 * 7/2001 Kerns ......................... 123/520

FOREIGN PATENT DOCUMENTS

| JP | 11-36921 | 2/1999 |
| JP | 11-200961 | 7/1999 |

* cited by examiner

Primary Examiner—Hieu T. Vo
(74) Attorney, Agent, or Firm—Kenyon & Kenyon

(57) ABSTRACT

A fuel vapor treating mechanism includes a canister for adsorbing fuel vapor produced in a fuel feed system. The treating mechanism purges the fuel vapor adsorbed by the canister, along with air, to an intake system of the engine. An ECU computes a value representing the flow rate of the purged gas as a value that represents the capability of the treating apparatus. The ECU sets a decision value in accordance with the amount of the fuel vapor produced in the fuel feed system. The decision value represents a required capability of the treating mechanism. When the value representing the capability is less than the decision value, the ECU prohibits stratified charge combustion and causes the engine to perform homogeneous charge combustion. Therefore, as many opportunities as possible are provided to perform stratified charge combustion, which improves fuel efficiency.

28 Claims, 11 Drawing Sheets

COMBUSTION CONTROL APPARATUS AND METHOD FOR ENGINES

BACKGROUND OF THE INVENTION

The present invention relates to a combustion control apparatus and a combustion control method for an engine that switches the combustion mode between a stratified charge combustion mode and a homogeneous charge combustion mode, and more particularly, to a combustion control apparatus for an engine equipped with a fuel vapor treating mechanism for treating fuel vapor produced in a fuel feed system and a combustion control method.

A fuel vapor treating mechanism for an engine typically performs a procedure for temporarily adsorbing, in a canister, fuel vapor produced in a fuel tank and then purging the adsorbed fuel together with air to an intake system.

In an engine that performs stratified charge combustion, such as a cylinder injection type engine, a large amount of purged gas, if introduced into an intake system during the stratified charge combustion, will deteriorate the combustion state. In stratified charge combustion, a variation in the fuel concentration near the ignition plug significantly affects the combustion state. If the introduction of purged gas causes the fuel concentration to be excessively rich near the ignition plug, normal ignition fails.

To address this problem, conventionally, when it is determined that a large amount of fuel vapor has been produced so that a large amount of purged gas must be introduced into the intake system, stratified charge combustion is prohibited and the combustion mode is switched to homogeneous charge combustion, which is less affected by the introduction of the purged gas. This is exemplified by the apparatus described in Japanese Unexamined Patent Publicfation (KOKAI) No. Hei 11-36921.

In general, switching the combustion mode to homogeneous charge combustion improves the capability of the fuel vapor treating mechanism. However, when the amount of fuel vapor is determined to be high, the combustion mode is always switched to homogeneous charge combustion, and stratified charge combustion is prohibited even if it is not necessary to do so. Specifically, although stratified charge combustion is greatly affected by the introduction of purged gas, a certain amount of purged gas in the intake system may be tolerable depending on the particular engine operating conditions. In addition, even if it is determined that a large amount of fuel vapor has been produced, the fuel vapor treatment capability may be sufficient. Thus, if the combustion mode is always switched to homogeneous charge combustion in such cases, the opportunities for performing stratified charge combustion are unnecessarily limited, which reduces the fuel efficiency.

SUMMARY OF THE INVENTION

It is an object of the present invention to provide a combustion control apparatus and a combustion control method for an engine that provides as many opportunities to perform stratified charge combustion as possible to improve the fuel efficiency.

To achieve the foregoing and other objectives and in accordance with the purpose of the present invention, a combustion control apparatus of an engine having a fuel vapor treating mechanism is provided. The treating mechanism has a canister, which adsorbs fuel vapor produced in a fuel feed system of the engine. The treating mechanism purges the fuel vapor adsorbed by the canister, along with air, to an intake system of the engine. The flow rate of the purged gas is adjusted in accordance with the running state of the engine. The engine operates in a combustion mode selected from a stratified charge combustion mode and a homogeneous charge combustion mode. The apparatus includes computing means, setting means and control means. The computing means computes a capability value based on the flow rate of the purged gas. The capability value represents the capability of the treating mechanism to treat fuel vapor. The setting means sets a decision value in accordance with the amount of fuel vapor produced in the fuel feed system. The decision value represents a required capability of the treating mechanism. When the capability value is less than the decision value, the control means prohibits stratified charge combustion, which causes the engine to perform homogeneous charge combustion.

The present invention may also be embodied as a method for controlling an engine that operates in a combustion mode selected from a stratified charge combustion mode and a homogeneous charge combustion mode. The method includes adsorbing fuel vapor produced in a fuel feed system of the engine by a canister of a fuel vapor treating mechanism, purging the fuel vapor adsorbed by the canister, along with air, to an intake system of the engine, adjusting the flow rate of the purged gas in accordance with the running state of the engine, computing a capability value based on the flow rate of the purged gas, the capability value representing the capability of the treating mechanism, setting a decision value in accordance with the amount of the fuel vapor produced in the fuel feed system, the decision value representing a required capability of the treating mechanism, and prohibiting stratified charge combustion and causing the engine to perform homogeneous charge combustion when the capability value is less than the decision value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(*b*) is a flow chart illustrating later stages of the routine in FIG. 6(*a*);

DETAILED DESCRIPTION OF THE PREFERRED EMBODIMENTS

[First Embodiment]

A first embodiment of the present invention will be described with reference to FIGS. 1 through 6(b).

Figure 1:
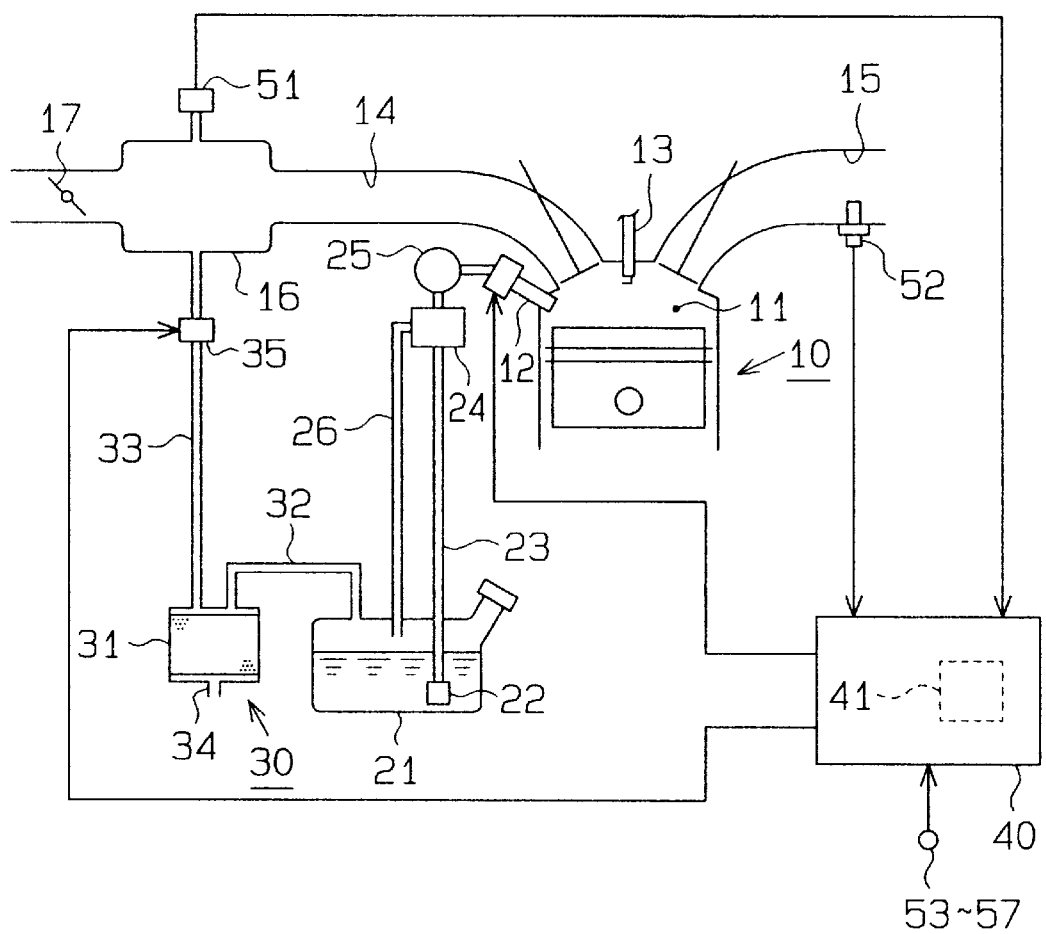
FIG. 1 is a schematic diagram illustrating the structure of an engine combustion control apparatus according to a first embodiment of the present invention.

FIG. 1 illustrates the general structure of an engine combustion control apparatus according to this embodiment. As illustrated in FIG. 1, the engine 10 includes an injector 12 for injecting fuel directly into a combustion chamber 11 and an ignition plug 13 for igniting the injected fuel. The combustion chamber 11 is also connected to an intake air passage 14, which forms part of an intake system, and an exhaust gas passage 15, which forms part of an exhaust system. A surge tank 16 is provided in the intake air passage 14, and a throttle valve 17 for adjusting the amount of intake air is provided upstream of the surge tank 16.

The injector 12 is connected to a high pressure pump 24, positioned near the engine 10, through a delivery pipe 25. Fuel in a fuel tank 21 is fed from a low pressure pump 22 to the high pressure pump 24 through a fuel feed passage 23. The fuel is pressurized by the high pressure pump 24 to a high pressure and is then pumped to the delivery pipe 25. Finally, the fuel is fed from the delivery pipe 25 to the injector 12. Excessive fuel, which is not pumped to the delivery pipe 25, is returned to the fuel tank 21 through a fuel return passage 26.

The fuel tank 21, respective pumps 22, 24, fuel feed passage 23, fuel return passage 26, delivery pipe 25, and injector 12 constitute a fuel feed system for feeding fuel to the engine 10.

The illustrated engine system is also provided with a fuel vapor treating mechanism 30 for collecting fuel vapor produced in the fuel feed system, to use the vapor without discharging it to the atmosphere, and an EGR mechanism (not shown).

As is well known in the art, the EGR mechanism is a mechanism for returning some of the exhaust gas flowing through the exhaust gas passage 15 to the intake air passage 14 (surge tank 16) through an EGR passage (not shown) to lower the combustion temperature, which reduces NOx (nitrogen oxides) in the exhaust gas.

The fuel vapor treating mechanism 30 includes a canister 31 connected to the fuel tank 21 through a vapor passage 32; a purge passage 33 for connecting the canister 31 to the surge tank 16; an atmospheric air introduction passage 34, for introducing the atmospheric air into the canister 31; and a purge control valve 35, for opening and closing the purge passage 33.

Fuel vapor produced in the fuel feed system (a majority of which is produced in the fuel tank 21) is introduced into the canister 31 from the fuel tank 21 through the vapor passage 32 and is temporarily adsorbed by an adsorbent provided inside the canister 31.

As the purge control valve 35 is opened, atmospheric air is introduced into the canister 31 through the atmospheric air introduction passage 34. The fuel adsorbed in the canister 31 is consequently purged, together with the atmospheric air, into the surge tank 16, through the vapor passage 32. Fuel in the purged gas is burned in the combustion chamber 11 together with the fuel injected from the injector 12. Also, the flow rate of the purged gas is adjusted based on the size a valve opening of the purge control valve 35.

In the engine 10 according to this embodiment, the fuel injection mode for the injector 12 is changed between stratified charge combustion and homogeneous charge combustion. For example, in the stratified charge combustion, the fuel is injected at the final stage of the compression stroke. As a result, a layer of fuel/air mixture having a high fuel concentration is formed near the ignition plug 13 in the combustion chamber 11. This layer is ignited by the plug 13. The average air/fuel (A/F) ratio of the mixture in the combustion chamber 11 is leaner (for example, A/F=25 to 50) than the stoichiometric air-fuel ratio (A/F=14.5).

In the homogeneous charge combustion mode, on the other hand, the fuel is injected during the suction stroke. Consequently, a mixture having a substantially uniform fuel concentration is formed in the combustion chamber 11 in which the fuel is ignited. The air-fuel ratio of the mixture is equal to the stoichiometric air-fuel ratio.

The switching of the combustion mode between stratified charge combustion and homogeneous charge combustion is performed based on operating conditions of the engine 10, such as the engine load and the engine rotational speed. For example, the combustion mode is set to stratified charge combustion in a light load or low rotational speed range of the engine 10, and the combustion mode is set to homogeneous charge combustion in a heavy load or high rotational speed range of the engine 10.

Such switching of the combustion mode is performed by an electronic control unit (ECU) 40, which controls a variety of characteristics of the engine 10. The ECU 40 is connected to a variety of sensors for detecting operating conditions of the engine 10 and fetches detection signals from these sensors as needed.

For example, the ECU 40 receives detection signals from an intake air pressure sensor 51 for detecting the magnitude of the pressure within the surge tank 16 (intake air pressure); an air-fuel ratio sensor 52 for detecting the concentration of oxygen in the exhaust gas; a rotational speed sensor 53 for detecting the engine rotational speed; a pedal position sensor 54 for detecting the degree of depression of an acceleration pedal (not shown); a water temperature sensor 55 for detecting the temperature of the cooling water for the engine 10 (cooling water temperature); a vehicle speed sensor 56 for detecting the running speed of the vehicle (vehicle speed); and an ambient temperature sensor 57 for detecting the ambient temperature.

Based on the operating conditions of the engine 10 and the running state of the vehicle detected by these sensors 51 to 57, the ECU 40 executes a variety of controls such as combustion mode switching control; purged gas flow rate control; and air-fuel ratio feedback control during homogeneous charge combustion. Also, the ECU 40 includes a memory 41 for storing, among other things, programs and operation maps for executing the variety of control procedures, a variety of data, which are computed when executing the control procedures.

A description follows of the combustion mode switching control procedure executed by the combustion control apparatus according to this embodiment. The combustion mode switching control procedure monitors the flow rate of gas purged by the fuel vapor treating mechanism 30 to the intake system to prohibit stratified charge combustion and to switch the combustion mode to homogeneous charge combustion when it is determined that the purged gas flow rate is not sufficient for treating fuel vapor produced in the fuel feed system.

Then, after stratified charge combustion is prohibited, the amount of fuel adsorbed in the canister 31 is estimated based on the concentration of the fuel in the purged gas. Subsequently, stratified charge combustion is permitted again when it is estimated that the amount of adsorbed fuel has been reduced below a predetermined amount.

Figure 2:
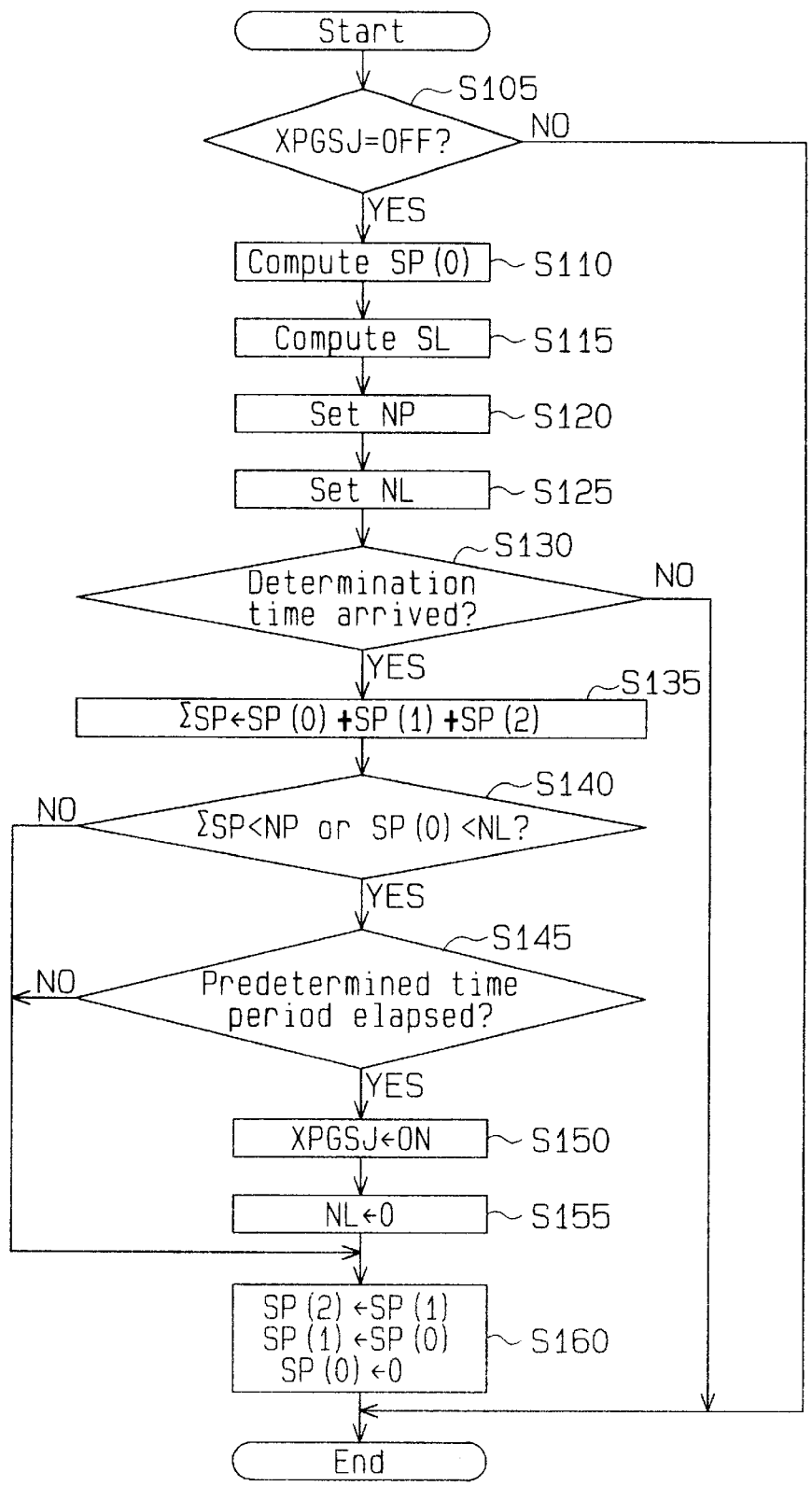
FIG. 2 is a flow chart illustrating a routine for prohibiting stratified charge combustion.

In the following, details of the combustion mode switching control procedure will be described with reference also to FIGS. 2 through 6(b). FIG. 2 is a flow chart illustrating a routine for prohibiting stratified charge combustion. The steps illustrated in this flow chart are executed by the ECU 40 as an interruption process, which is performed at predetermined time.

First, when the process is initiated, it is determined whether a prohibition flag XPGSJ is set to OFF (step 105).

The prohibition flag XPGSJ is set to ON when the capability of the fuel vapor treating mechanism 30 is below the required capability. This prohibits stratified charge combustion and switches the combustion mode to homogeneous charge combustion. The prohibition flag XPGSJ is OFF when it is estimated that the amount of adsorbed fuel in the canister 31 is less than the predetermined amount by carrying out homogeneous charge combustion. The status of the prohibition flag XPGSJ is stored in the memory 41 of the ECU 40 even after the operation of the engine 10 is stopped.

When it is determined that the prohibition flag XPGSJ is ON (NO in step 105), the sequence of processing steps is temporarily terminated.

On the other hand, when it is determined that the prohibition flag XPGSJ is OFF (YES in step 105), an accumulated amount of a purged gas flow rate PQ (flow rate accumulated value) SP(0) is computed in accordance with the following equation [1] (step 110):

$$SP(0) \leftarrow \text{current } SP(0) + PQ \qquad [1]$$

This flow rate accumulated value SP(0) evaluates the capability of the current fuel vapor treating mechanism 30 for treating the fuel vapor. When the flow rate accumulated value SP(0) is larger, more fuel can be purged from the canister 31 to the intake system.

Also, in the foregoing equation [1], a purged gas flow rate PQ is computed based on the intake air pressure, the atmospheric pressure corresponding to the internal pressure of the canister 31, and an opening instruction value DPGR for the purge valve 35.

Here, the intake air pressure is obtained based on a detection signal from the intake air pressure sensor 51, and the atmospheric pressure is obtained by correcting the intake air pressure based on the opening of the throttle valve 17, the engine rotational speed, and so on. Also, the opening instruction value DPGR for the purge control valve 35 is set through another routine. The opening instruction value DPGR is based on engine operating conditions including the acceleration pedal depression degree, the engine rotational speed to prevent deterioration of the combustion resulting from the introduction of the purged gas even if the concentration of fuel in the purged gas is extremely high or if the purged gas flow rate is significantly increased.

In addition, the relationship between the intake air pressure, the atmospheric pressure, the opening instruction value DPGR, and the purged gas flow rate PQ has been previously established, based on experiments, and stored as a function map in the memory 41 of the ECU 40. This function map is referenced in computing the purged gas flow rate PG. The purged gas flow rate PQ increases as the difference between the intake air pressure and the atmospheric pressure increases, or as the opening instruction value DPGR increases.

Next, an accumulated engine load value (load accumulated value) SL is computed in accordance with the following equation [2] (step 115).

$$SL \leftarrow \text{current } SL + L \qquad [2]$$

where L is a value representative of the engine load (load equivalent value).

The load accumulated value SL represents the amount of fuel vapor that is estimated to be produced in the fuel feed system in a period during which stratified charge combustion is permitted. In other words, it can be estimated that a larger amount of fuel vapor is produced in the fuel feed system when the load accumulated value SL is larger. The amount of produced fuel vapor can be thus estimated based on the load accumulated value SL for the following reason.

As the engine load increases, the amount of fuel injection increases, which causes an increase in the total amount of combustion heat generated in the combustion chamber 11. The fuel in the fuel feed system is heated by the combustion heat and the exhaust heat, which also increases when the combustion heat increases. In the fuel feed system of this embodiment, some of fuel is returned to the fuel tank 21 from the high pressure pump 24 to the fuel return passage 26, which increases the temperature of the fuel within the tank 21.

As a result of the elevated temperature of the fuel in the fuel feed system, evaporation of the fuel increases, which increases the amount of fuel vapor. Thus, it is possible to estimate the amount of produced fuel vapor based on the load accumulated value SL.

Also, in the aforementioned equation [2], the load equivalent value L is set based on the acceleration pedal depression degree and the vehicle speed. Specifically, the load equivalent value L increases as the acceleration pedal depression degree increases or as the vehicle speed increases. Thus, the load accumulated value SL increases at a greater rate as the acceleration pedal depression degree increases or as the vehicle speed increases. The contents of the load accumulated value SL is stored in the memory 41 of the ECU 40 even after the operation of the engine 10 is stopped.

Next, a first decision value NP is set based on the ambient temperature and the atmospheric pressure (step 120). The first decision value NP determines whether or not the flow rate accumulated value SP(0), i.e., the performance capability of the fuel vapor treating mechanism 30, is sufficient for the production of a certain amount of fuel vapor.

Figure 3:
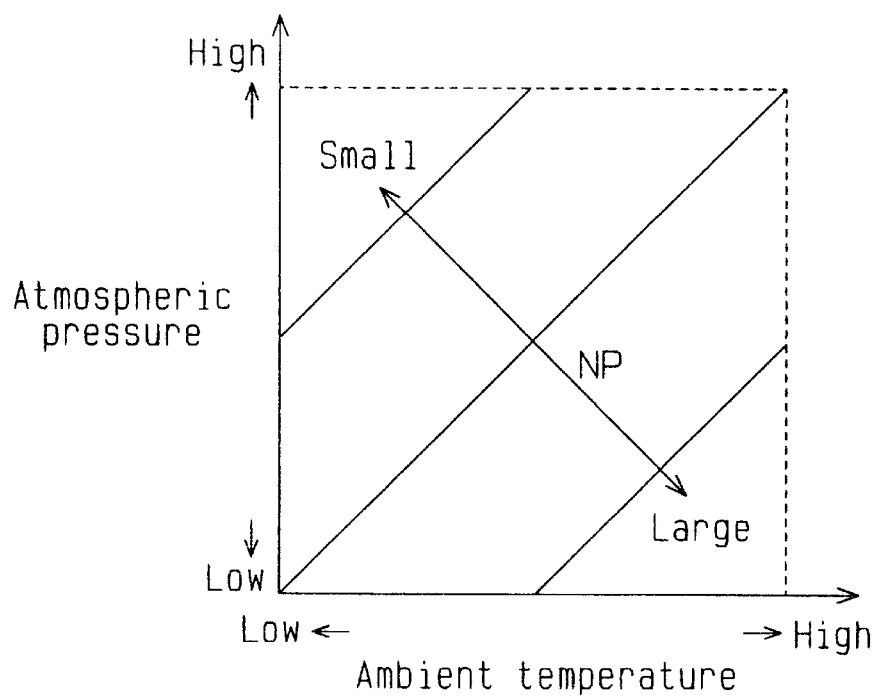
FIG. 3 is a map showing the relationship of a first decision value to the ambient temperature and the atmospheric pressure.

FIG. 3 is a function map showing the relationship of the first decision value NP to the ambient temperature and the atmospheric pressure. As shown in FIG. 3, the first decision value NP increases as the ambient temperature increases or as the atmospheric pressure is lower. This is because a higher ambient temperature increases the temperature of the fuel in the fuel feed system, which promotes evaporation of the fuel. A lower atmospheric pressure permits more fuel to evaporate more. Consequently, the amount of fuel vapor increases, which requires the fuel vapor treating mechanism 30 to handle more vapor. The relationship of the first decision value NP to the ambient temperature and the atmospheric pressure has been predetermined through experiments and is stored in the memory 41 of the ECU 40 as function data.

Next, a second decision value NL is set based on the load accumulated value SL and the atmospheric pressure (step 125). The second decision value NL is used to determine whether or not the performance capability of the fuel vapor treating mechanism 30 is sufficient for a certain amount of fuel vapor production, which is similar to the function of the first decision value NP.

Figure 4:
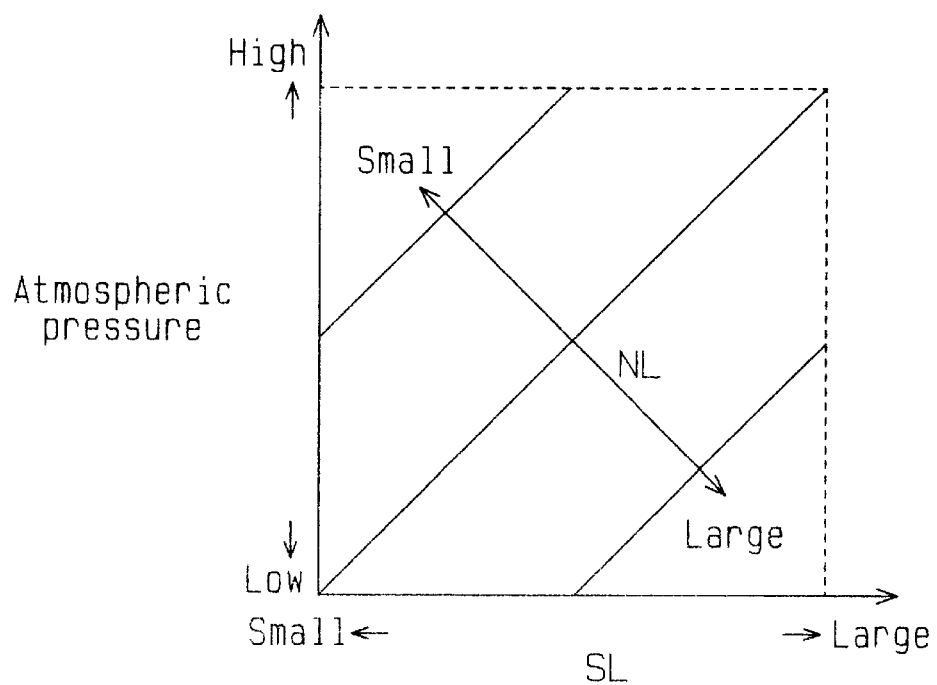
FIG. 4 is a map showing the relationship of a second decision value to a load accumulated value and the atmospheric pressure.

FIG. 4 is a function map showing the relationship of the second decision value NL to the load accumulated value SL and the atmospheric pressure. As shown in FIG. 4, the second decision value NL increases as the load accumulated value SL increases, or as the atmospheric pressure is lower. As described above, this is because a larger load accumulated value SL or lower atmospheric pressure results in the production of a larger amount of fuel vapor, so that the fuel vapor treating mechanism 30 is required to handle more vapor. The relationship of the second decision value NL to the load accumulated value SL and the atmospheric pressure has been predetermined through experiments and is stored in the memory 41 of the ECU 40 as function data.

The decision values for determining whether or not the capability of the fuel vapor treating mechanism 30 is sufficient for the production of a certain amount of fuel vapor, that is, the first decision value NP and the second decision value NL are provided for the following reasons.

When the engine 10 is being operated in a relatively heavy load state, the second decision value NL is relatively large. Therefore, unless a sufficient purged gas flow rate is ensured, it is determined that the capability of the fuel vapor treating mechanism 30 is not sufficient.

On the other hand, when the vehicle is stopped at a high ambient temperature while the engine 10 has been idled for a long period, the second decision value NL is relatively small. However, when the vehicle is stopped in such a situation, while the fuel temperature is not raised due to combustion heat, the absence of air flow causes the fuel temperature to elevate due to heat from the road surface.

If it is determined whether or not the fuel vapor treating mechanism 30 has sufficient capability for a particular situation based only on the second decision value NL, an erroneous determination might be made in the situation mentioned above. Therefore, the first decision value NP, which varies depending on the ambient temperature, is also used in the determination.

After the first decision value NP and the second decision value NL are determined, it is determined whether or not the time has come for determining the capability of the fuel vapor treating mechanism 30 (step 130). When it is determined in step 130 that the time for determining the capability of the fuel vapor treating mechanism 30 has not yet come (NO in step 130), the routine is temporarily terminated.

On the other hand, when the time is right for determining the performance capability (YES in step 130), the previous flow rate accumulated value SP(1) and the flow rate accumulated value prior to that SP(2) are added to the current flow rate accumulated value SP(0) in accordance with the following equation [3], and the sum ΣSP is the flow rate accumulated value that is actually compared with the first decision value NP (step 135):

$$\Sigma SP \leftarrow SP(0)+SP(1)+SP(2) \qquad [3]$$

Figure 5:
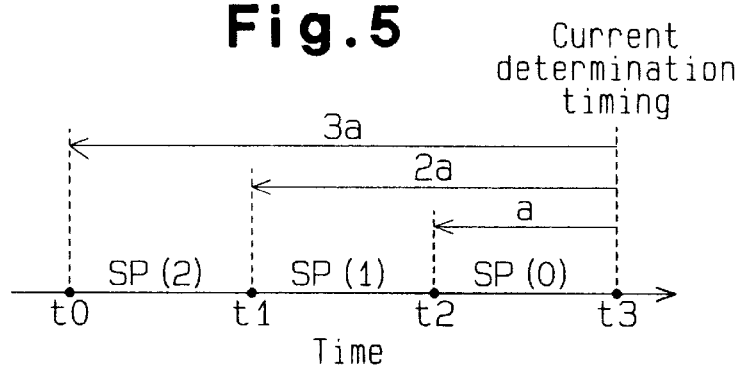
FIG. 5 is a timing chart illustrating how each flow rate accumulated value is computed.

FIG. 5 is a timing chart showing the relationship between the current flow rate accumulated value SP(0) and the two previous flow rate accumulated values SP(1), SP(2).

As shown in FIG. 5, assuming that the time for determining the capability of the fuel vapor treating mechanism 30 comes, for example, every predetermined period a, the current flow rate accumulated value SP(0) indicates an accumulated value for the predetermined period a between the current determination time t3 and the previous determination time t2. The previous flow rate accumulated value SP(1), on the other hand, indicates an accumulated value for the predetermined period a from the previous determination time t2 to an earlier determination time t1 by the predetermined period a. Likewise, the further previous flow rate accumulated value SP(2) indicates an accumulated value for the predetermined period a from the further previous determination time t1 to the determination time t0 by the predetermined period a.

For reference, the predetermined period a is set to five minutes in this embodiment. The summed flow rate accumulated value ΣSP, which is compared with the first decision value NP, is a purged gas flow rate accumulated value for 15 minutes. The current flow rate accumulated value SP(0) is used for comparison with the second decision value NL.

The summed purged gas flow rate accumulated value ΣSP, which is compared with the first decision value NP, is an accumulated value for a longer period than the purged gas flow rate accumulated value SP(0), which is compared with the second decision value NL, for the following reason.

Since both the ambient temperature and the atmospheric pressure will not change greatly over time and will change slowly, the first decision value NP also slowly varies following these parameters. On the other hand, since the load accumulated value SL can change rapidly, depending on the load state of the engine 10, the second decision value NL may also change rapidly. For these reasons, different integration periods are employed for the different purged gas flow rate accumulated values (ΣSP, SP(0)), in accordance with the variation of the respective decision values NP, NL.

Thus, the summed flow rate accumulated value ΣSP, which is compared with the first decision value NP, does not reflect a change in the purged gas flow rate over a short time period, but reflects the trend of the change in the flow rate over a relatively long period. On the other hand, the flow rate accumulated value SP(0), which is compared with the second decision value NL, does reflect a change in the purged gas flow rate for a short time period in response to a change in the operating conditions of the engine 10.

Next, it is determined whether or not at least one of the following two conditions expressed by equations [4], [5] is satisfied (step 140). In other words, it is determined whether or not the actual capability of the fuel vapor treating mechanism 30 is below the required capability.

$$\Sigma SP<NP \qquad [4]$$

$$SP(0)<NL \qquad [5]$$

Upon determining that the capability of the fuel vapor treating mechanism 30 is below the required capability (YES in step 140), it is next determined whether or not the predetermined time period (for example, 20 minutes) has elapsed since the prohibition flag XPGSJ was switched to OFF (step 145). In other words, it is determined whether or not the predetermined time period has elapsed from the time stratified charge combustion was permitted.

When it is determined that the predetermined time period has not elapsed (NO in step 145), only a short time has passed since homogeneous charge combustion was stopped, so that only a small amount of fuel is adsorbed in the canister 31. More specifically, in this event, even if it is determined that the capability of the fuel vapor treating mechanism 30 is below the required capability (YES in step 140), only a small amount of fuel is adsorbed in the canister 31, so that it is not necessary to prohibit stratified charge combustion and to perform homogeneous charge combustion.

On the other hand, when it is determined that predetermined time period has elapsed from the time the stratified charge combustion was permitted (YES in step 145), the amount of fuel adsorbed in the canister 31 is likely to have increased, since stratified charge combustion has been carried out for that time period, so the prohibition flag XPGSJ is set to ON to prohibit stratified charge combustion (step 150), and the load accumulated value NL reset to zero (step 155).

After the load accumulated value NL is reset or when it is determined in the foregoing determination process steps (steps 140, 145) that the performance capability of the fuel vapor treating mechanism 30 satisfies the requirements (NO in step 140) or that the predetermined time period has not elapsed from the time stratified charge combustion was permitted (NO in step 145), the previous flow rate accumulated value SP(1) is saved as the further previous flow rate accumulated value SP(2), the current flow rate accumulated value SP(0) is saved as the previous flow rate accumulated value SP(1), and the current flow rate accumulated value SP(0) is reset to zero (step 160) in preparation for the next cycle (step 160). Then, the routine is temporarily terminated.

Next, a routine for setting the combustion mode to homogeneous charge combustion based on the prohibition flag XPGSJ, and a routine for setting the prohibition flag XPGSJ to OFF to again permit stratified charge combustion will be described with reference to the flow charts illustrated in FIGS. 6(a) and 6(b). The sequence of steps illustrated in the flow charts is executed by the ECU 40 as an interruption process, which is initiated at predetermined time intervals.

First, when this process is initiated, it is determined whether or not the prohibition flag XPGSJ is set to ON (step 210). When it is determined here that the prohibition flag XPGSJ is OFF (NO in step 210), the fuel vapor treating mechanism 30 a sufficient the performance capability to accommodate the produced fuel vapor, and stratified charge combustion need not be prohibited. Thus, the combustion mode of the engine 10 is set in accordance with the operating conditions (step 290), and the routine is temporarily terminated.

On the other hand, when the prohibition flag XPGSJ is ON (YES in step 210), the capability of the fuel vapor treating mechanism 30 is below that required stratified charge combustion is prohibited, and the combustion mode is set to homogeneous charge combustion (step 215).

Next, an air-fuel ratio learned value KG, which is taken when the purge control valve 35 is fully closed, is updated through an air-fuel ratio feedback control step (step 220). Here, as is well known in the art, the air-fuel ratio feedback control increases or decreases the amount of fuel injection (fuel injection time) based on a detection signal from the air-fuel ratio sensor 52 to direct the current air-fuel ratio (actual air-fuel ratio) to the stoichiometric air-fuel ratio. The air-fuel ratio learned value KG in turn compensates for the deviation of the actual air-fuel ratio from the stoichiometric air-fuel ratio, which may occur, for example, due to individual differences and changes caused by time in the fuel injection characteristics of the injector 12.

When the air-fuel ratio feedback control procedure is initiated, the amount of fuel injection (fuel injection time) TAU is computed, for example, in accordance with the following equation [6]:

$$TAU \leftarrow K1 \cdot TP \cdot (FAF + KG) + K2 \qquad [6]$$

where K1 and K2 are various correction coefficients; TP is a basic amount of fuel injection computed based on the intake air pressure, engine rotational speed, and other factors; and FAF is an air-fuel ratio feedback coefficient. For example, the air-fuel ratio feedback coefficient FAF is made to be a value larger than 1.0, when the actual air-fuel ratio is leaner than the stoichiometric air-fuel ratio, in accordance with the difference, and is made to be smaller than 1.0, when the actual air-fuel ratio is richer the stoichiometric air-fuel ratio, in accordance with the difference.

The air-fuel ratio learned value KG is learned when an average value FAFAVE of the air-fuel ratio feedback coefficient FAF is constantly deviated from 1.0, as a value for canceling the deviation. For example, when the average value FAFAVE of the air-fuel ratio feedback coefficient FAF is 1.05, the air-fuel ratio learned value KG is learned as 0.05. The air-fuel ratio learned value KG causes a change in the average value FAFAVE of the air-fuel ratio feedback coefficient FAF to approach 1.0.

Next, it is determined whether or not the air-fuel ratio learned value KG has been updated, in other words, whether or not the average value FAFAVE of the air-fuel ratio feedback coefficient FAF has converged to the vicinity of 1.0 (step 225). When it is determined here that the air-fuel ratio learned value KG has not been updated (NO in step 225), the routine is temporarily terminated.

On the other hand, when it is determined that the air-fuel ratio learned value KG has been updated (YES in step 225), the purge control valve 35 is opened to start purging (step 230). Specifically, in this embodiment, even when the prohibition flag XPGSJ is ON to switch the combustion mode to homogeneous charge combustion, the purge control valve 35 is kept fully closed until the air-fuel ratio learned value KG has been updated, to disable purging.

The opening of the purge control value 35 is performed as follows, unlike the case where the prohibition flag XPGSJ is OFF. The required purge rate PGR is first set based on various operating conditions of the engine 10, such as the current intake air amount (which is determined based on the intake air pressure and the engine rotational speed), and the engine rotational speed.

The required purge rate PGR indicates the proportion of purged gas, which is introduced into the surge tank 16 through the purge passage 33, within intake air fed into the combustion chamber 11. Also, the required purge rate PGR is limited to a predetermined upper limit value, which increases over time, or less, to prevent the actual air-fuel ratio from largely deviating from the stoichiometric air-fuel ratio due to sudden introduction of a large amount of purged gas until the predetermined time period TPGST elapses from the time the purging was started. Thus, when purging is started, the required purge rate PGR gradually increases to a value based on the operating conditions of the engine 10 over the predetermined time period TPGST.

Next, under the current intake air amount and engine rotational speed, a full open purge rate PGRO is computed for a fully opened purge control valve 35. The relationship of the full open purge rate PGRO to the intake air amount and the engine rotational speed is predetermined through experiments and stored in the memory 41 of the ECU 40. Then, after computing the required purge rate PGR and the full open purge rate PGRO as mentioned above, the opening instruction value DPGR is set for the purge control valve 35 is set in accordance with the following equation [7]:

$$DPGR \leftarrow k1 \cdot PGR/PGRO + k2 \qquad [7]$$

where k1, k2 are correction coefficients.

Subsequently, the opening of the purge control valve 35 is controlled based on the opening instruction value DPGR to perform purging.

After purging is started in step 230, the purged gas concentration learned value FGPG is fetched (step 235). The concentration learned value FGPG reflects the purged gas concentration and is updated in accordance with the tendency by which the air-fuel ratio deviates in the air-fuel ratio feedback control. The concentration learned value FGPG is updated, for example, based on the following equation [8]:

$$FGPG \leftarrow [\text{current } FGPG] + [1 - FAFAVE)/PGR \qquad [8]$$

Also, the concentration learned value FGPG is reflected in a computation of the amount TAU of fuel injection during the purging operation, as expressed by the following equation [9]:

$$TAU \leftarrow K1 \cdot TP \cdot (FAF + KG - FGPG \times PGR) + K2 \qquad [9]$$

Thus, when purging results in the air-fuel ratio becoming richer than the stoichiometric air-fuel ratio, so that the average value FAFAVE of the air-fuel ratio feedback coefficient FAF is constantly smaller than 1.0, the concentration learned value FGPG is updated to a larger value on the assumption that purged gas having a high fuel concentration is being introduced into the intake system (see equation [8]). As a result, the amount TAU of fuel injection is decreased (see equation [9]), causing the average value FAFAVE of the air-fuel ratio feedback coefficient FAF to approach 1.0 due to the decrease in the fuel injection amount TAU.

On the other hand, when the air-fuel ratio becomes leaner than the stoichiometric air-fuel ratio, so that the average value FAFAVE of the air-fuel ratio feedback coefficient FAF is constantly larger than 1.0, the concentration learned value FGPG is updated to a smaller value on the assumption that purged gas having a low fuel concentration is being introduced into the intake system (see equation [8]). As a result, the amount TAU of fuel injection is increased (see equation [9]), causing the average value FAFAVE of the air-fuel ratio feedback coefficient FAF to approach 1.0 due to the increase in the fuel injection amount TAU.

Also, when the average value FAFAVE of the air-fuel ratio feedback coefficient FAF is near 1.0, the purged gas concentration is more precisely reflected by the concentration learned value FGPG (i.e., the learning is advanced), and the learned value FGPG is a more reliable indicator of the fuel concentration of the purged gas concentration.

After the updated concentration learned value FGPG is fetched, this concentration learned value FGPG is compared with a maximum value FGPGMAX of the fetched concentration learned value FGPG (step 240). When the latest concentration learned value FGPG is larger than the maximum value FGPGMAX (YES in step 240), the latest concentration learned value FGPG, which was just fetched, is updated as the new maximum value FGPGMAX (step 245). On the other hand, when the latest concentration learned value FGPG is equal to or smaller than the maximum value FGPGMAX (NO in step 240), such an update of the maximum value FGPGMAX is skipped.

Next, the required flow rate accumulated value SPFD is set for the purged gas based on the maximum value FGPGMAX of the concentration learned value FGPG (step 250). The required flow rate accumulated value SPFD is the total purged gas flow rate that is estimated to be necessary for reducing the amount of adsorbed fuel in the canister 31 to the predetermined amount or less by purging. Therefore, as the maximum value FGPGMAX of the concentration learned value FGPG increases, the required flow rate accumulated value SPFD increases. The relationship between the required flow rate accumulated value SPFD and the maximum value FGPGMAX of the concentration learned value FGPG is predetermined through experiments and stored in the memory 41 of the ECU 40.

Next, an actual accumulated value (actual flow rate accumulated value) SPFA of the purged gas flow rate is computed based on the following equation [10] (step 255). The actual flow rate accumulated value SPFA indicates the accumulated purged gas flow rate from the time stratified charge combustion was prohibited and purging was started.

$$SPFA \leftarrow \text{current } SPFA + PQ \qquad [10]$$

In the above equation [10], the purged gas flow rate PQ is computed by multiplying the required purge rate PGR by the current intake air amount.

Figure 6A:
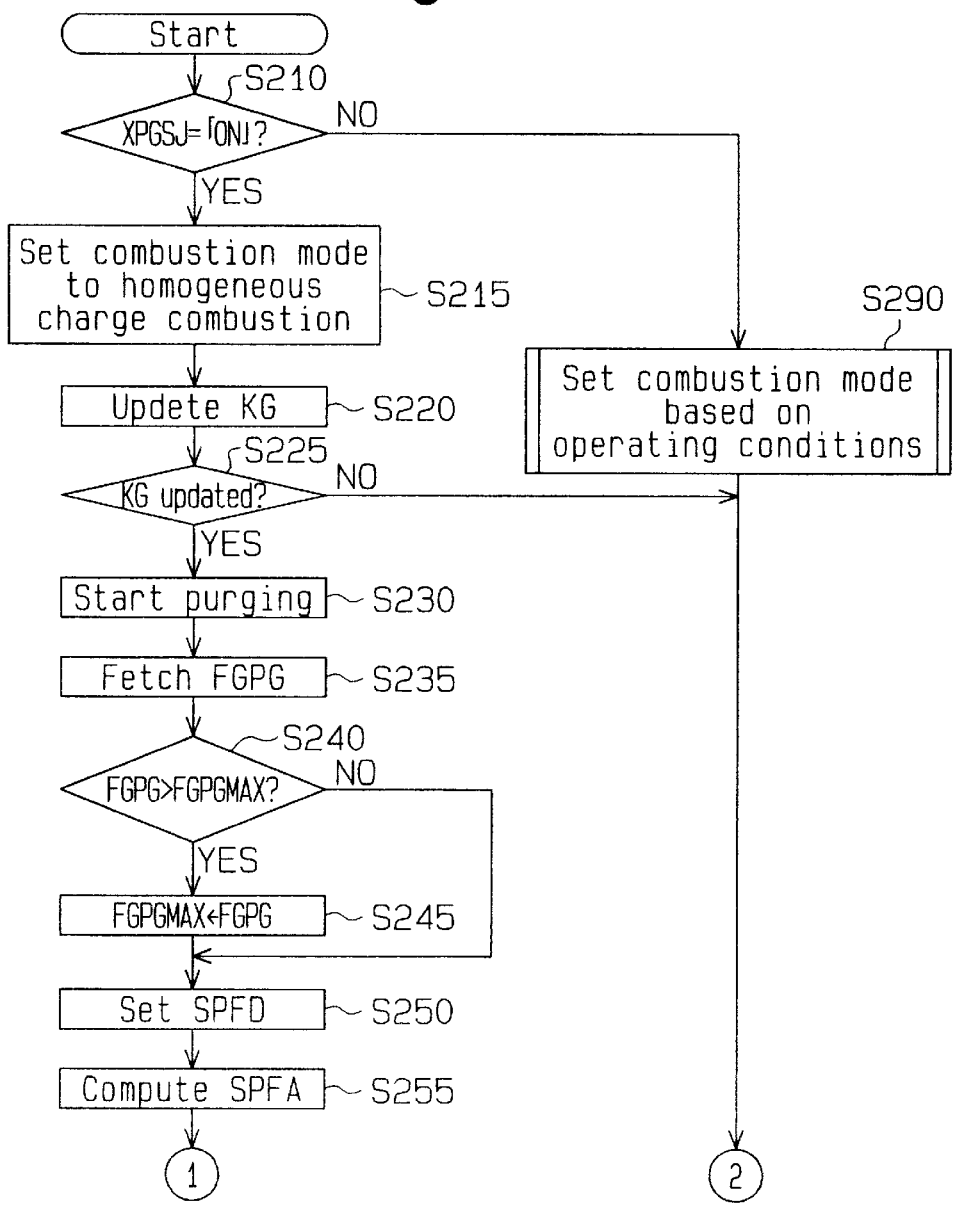
FIG. 6(*a*) is a flow chart illustrating a routine for setting the combustion mode to the homogeneous charge combustion, and a routine for permitting stratified charge combustion.
Figure 6B:
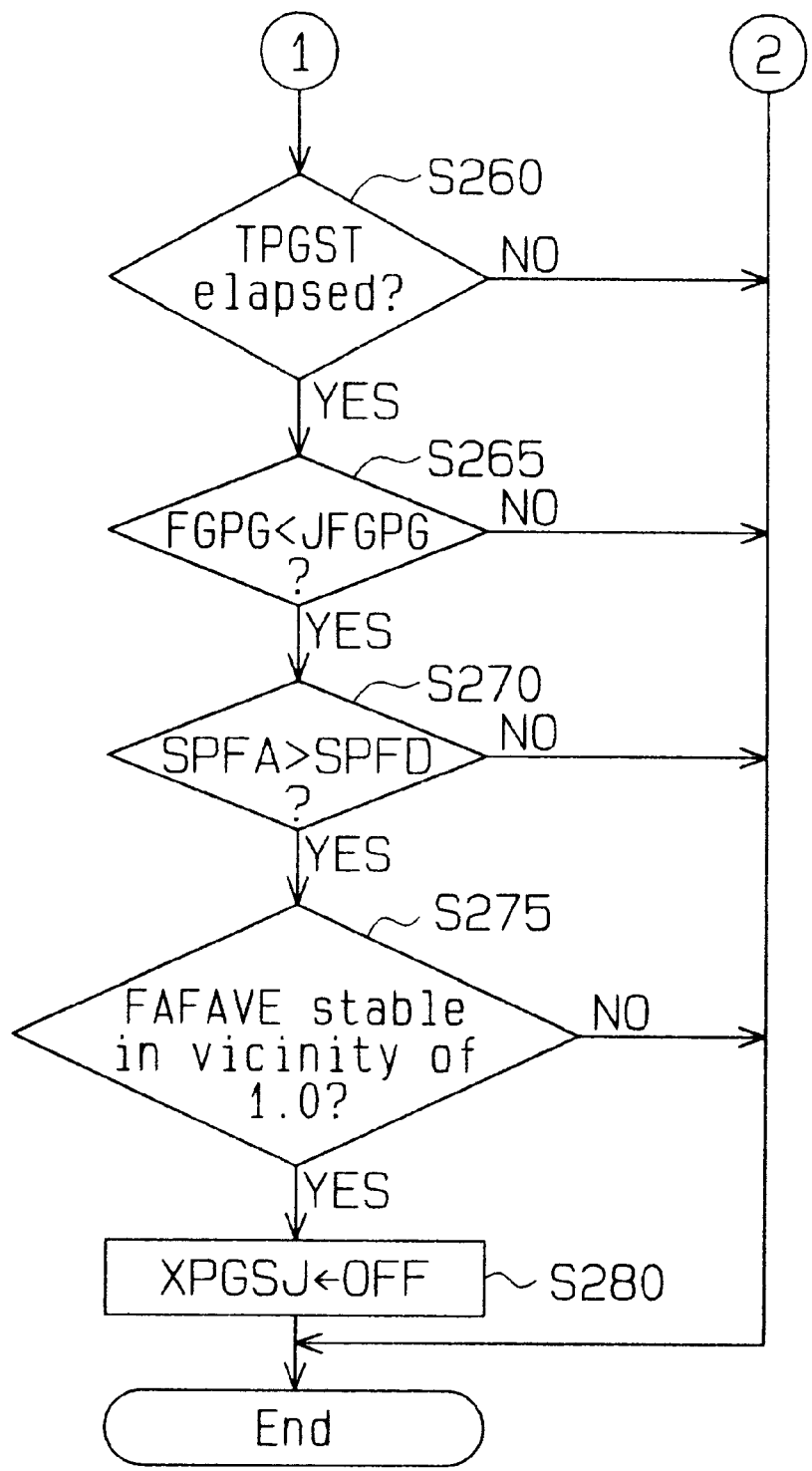

Next, it is determined whether or not the predetermined time period TPGST, in which the required purge rate PGR is limited, has elapsed from the time purging was started (step 260 in FIG. 6(b)). When it is determined that the predetermined time period TPGST has not elapsed (NO in step 260), the routine is temporarily terminated until the required purge rate PGR becomes suitable for a particular driving state.

On the other hand, when it is determined that the predetermined time TPGST has elapsed (YES in step 260), it is determined whether or not the concentration learned value FGPG is less than the predetermined decision value JFGPG (step 265). The decision value JFGPG determines whether or not the amount of adsorbed fuel in the canister 31 has been reduced to the predetermined amount, which is significantly smaller than its limit value, or less, based on the concentration of the fuel in the purged gas, i.e., the concentration learned value FGPG.

Upon determining that the concentration learned value FGPG is below the decision value JFGPG (YES in step 265), it is determined whether or not the actual flow rate accumulated value SPFA exceeds the required flow rate accumulated value SPFD (step 270). Upon determining that the actual flow rate accumulated value SPFA exceeds the required flow rate accumulated value SPFD (YES in step 270), it is determined whether or not the average value FAFAVE of the air-fuel ratio feedback coefficient FAF is stable in the vicinity of 1.0, in other words, whether or not the concentration learned value FGPG is reliable (step 275). Here, when the average value FAFAVE of the air-fuel ratio feedback coefficient FAF lies, for example, in a range of 0.95<FAFAVE<1.05, it is determined that the average value FAFAVE is stable in the vicinity of 1.0.

When it is determined that the average value FAFAVE of the air-fuel ratio feedback coefficient FAF is stable in the vicinity of 1.0 (YES in step 275), it can be estimated that the amount of adsorbed fuel in the canister 31, which is estimated based on the concentration learned value FGPG, has been reduced to the predetermined amount or less by, and it can be determined that the accuracy of the concentration learned value FGPG, which is used for the estimation, is high, and the prohibition flag XPGSJ is switched to OFF (step 280). Then, the routine is temporarily terminated.

On the other hand, when it is determined that the concentration learned value FGPG is equal to or larger than the decision value JFGPG (NO in step 265); when it is determined that the actual flow rate accumulated value SPFA is equal to or smaller than the required flow rate accumulated value SPFD (NO in step 270); or when it cannot be determined that the average value FAFAVE of the air-fuel ratio feedback coefficient FAF is stable in the vicinity of 1.0 (NO in step 275), it cannot be estimated that the amount of adsorbed fuel in the canister 31 has been reduced to the predetermined amount or less or it can be determined that the concentration learned value FGPG has a low learning accuracy and, accordingly, the estimation result of the amount of adsorbed fuel is also low in accuracy, and the routine is temporarily terminated.

This embodiment has the following advantages.

The flow rate accumulated values $\Sigma SP$, $SP(0)$ of the purged gas corresponding to the actual performance capability of the fuel vapor treating mechanism 30 are compared with the respective decision values NP, NL corresponding to the required performance capability in accordance with the amount of produced fuel vapor. Stratified charge combustion is prohibited and the combustion mode is switched to homogeneous charge combustion if the flow rate accumulated values are below the respective decision values. Thus, the opportunities for performing stratified charge combustion are not unnecessarily limited. It is therefore possible to increase the opportunities for performing stratified charge combustion as much as possible to improve the fuel efficiency.

The actual capability of the fuel vapor treating mechanism 30 is evaluated by the purged gas flow rate accumulated values $\Sigma SP$, $SP(0)$. Thus, unlike the evaluation of the capability, for example, based on the purged gas flow rate itself, even if the purged gas flow rate temporarily fluctuates in response to varying operating conditions of the engine 10, the combustion mode will not be frequently switched in response to such temporary fluctuations. It is therefore possible to avoid frequent switching of the combustion mode. That is, the estimation of the performance capability of the fuel vapor treating mechanism 30 is more appropriate.

Since all the decision values NP, NL are set based on the ambient temperature and the load accumulated value SL, in addition to the atmospheric pressure, the decision values can be appropriately set in accordance with the amount of produced fuel vapor, which varies according to the ambient temperature and the load accumulated value SL.

Since the purged gas flow rate accumulated value $\Sigma SP$, which is compared with the first decision value NP, indicates an accumulated value for a longer integration period than that of the purged gas flow rate accumulated value $SP(0)$, which is compared with the second decision value NL, the flow rate accumulated values $\Sigma SP$, $S(0)$ can be appropriately set in accordance with the characteristics by which the respective decision values NP, NL change. It is therefore possible to accurately compare the respective flow rate accumulated values $\Sigma SP$, $SP(0)$ with the decision values NP, NL associated therewith and thus improve the reliability of the comparison results.

Further, the purged gas flow rate accumulated value $SP(0)$ is computed based on the intake air pressure, the atmospheric pressure, and the opening instruction value DPGR for the purge control valve 35. It is therefore possible to precisely compute the flow rate accumulated value $SP(0)$ even if a large amount of exhaust gas is recirculated into the intake air passage 14 by the EGR mechanism.

After stratified charge combustion is prohibited and the combustion mode is switched to homogeneous charge combustion, the amount of adsorbed fuel in the canister 31 is estimated. Stratified charge combustion is permitted again when it is estimated that the amount of adsorbed fuel has been reduced to the predetermined amount or less. It is therefore possible to appropriately set a period in which stratified charge combustion is prohibited in accordance with the amount of adsorbed fuel in the canister 31. Consequently, reduction of the amount of adsorbed fuel in the canister 31 is ensured, which prevents the discharge of fuel vapor to the atmosphere.

Since the amount of adsorbed fuel in the canister 31 is estimated based on the concentration learned value FGPG, which is acquired through the air-fuel ratio feedback control, the estimation of the amount of adsorbed fuel in the canister 31 can be made without providing an additional sensor.

Updating of the air-fuel ratio learned value KG is completed while purging is temporarily stopped, and purging is resumed after compensating for deviation between an actual air-fuel ratio and the stoichiometric air-fuel ratio to learn the concentration learned value FGPG. Consequently, the concentration learned value FGPG more precisely represents the concentration of fuel in the purged gas, which improves the accuracy of the estimation of the amount of adsorbed fuel.

Even if it is estimated that the amount of adsorbed fuel in the canister 31 has been reduced to the predetermined value or less, stratified charge combustion is not permitted if the average value FAFAVE of the air-fuel ratio feedback coefficient FAF is not stable in the vicinity of 1.0, which would indicate that the concentration learned value FGPG cannot be reliably represent the purged gas concentration. Therefore, stratified charge combustion is not permitted when the estimation of the amount of adsorbed fuel in the canister 31 is based on a concentration learned value FGPG that does not reliably reflect the concentration of the fuel in the purged gas.

When the predetermined time period has not elapsed after stratified charge combustion was permitted, switching the combustion mode from stratified charge combustion to homogeneous charge combustion is prohibited, even if the purged gas flow rate accumulated values $\Sigma SP$, $SP(0)$ are below the decision values NP, NL, on the assumption that the ability of the canister 31 to adsorb fuel is sufficient. It is therefore possible to prevent the combustion mode from being unnecessarily switched to homogeneous charge combustion, which further improves fuel efficiency.

[Second Embodiment]

Next, a second embodiment of the present invention will be described, centering on differences between this embodiment and the first embodiment. In the first embodiment, the purged gas flow rate accumulated value $\Sigma SP$ for comparison with the first decision value NP is not computed as a meaningful value unless at least the predetermined time period (15 minutes) has elapsed after the engine 10 was started. Thus, until that time has elapsed, it will never be determined in step 130 of FIG. 2 that the time for determining the performance capability has come, and accordingly, stratified charge combustion will not be prohibited.

However, in the first embodiment, when the engine 10 is started with an extremely large amount of adsorbed fuel in the canister 31, for example, as a result of a large amount of fuel vapor produced in the fuel feed system while the engine is stopped, the amount of adsorbed fuel in the canister 31 will reach a limit immediately after the engine 10 is started, and will fail to adsorb additional fuel vapor.

To solve this problem, the combustion control apparatus according to this embodiment sets the prohibition flag XPGSJ to ON when it is determined that the engine is in a starting condition in which the canister 31 has already adsorbed a large amount of fuel, to set the combustion mode to the homogeneous charge combustion after the engine is started.

Figure 7:
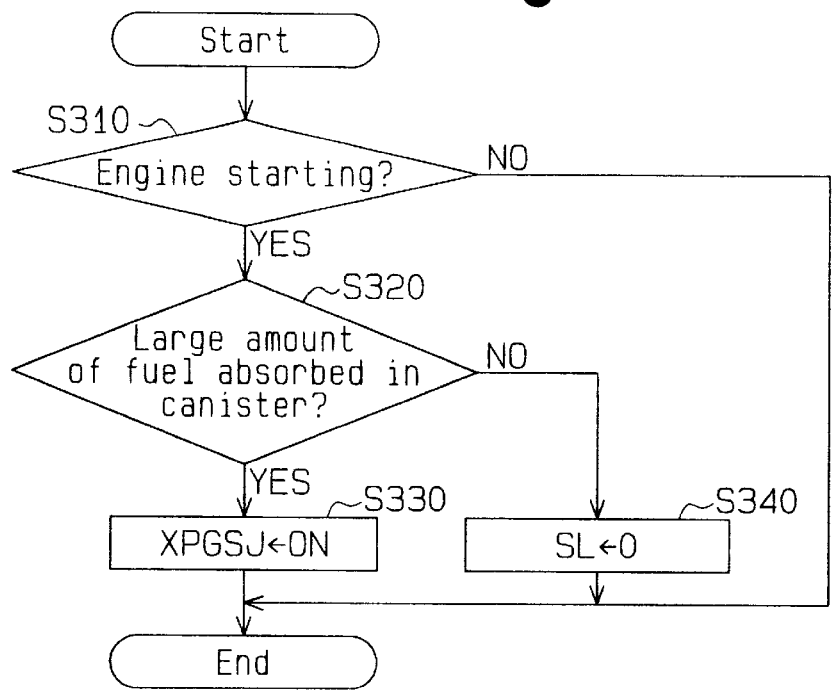
FIG. 7 is a flow chart illustrating a routine for choosing homogeneous charge combustion when starting the engine in a second embodiment of the present invention.

In the following, the combustion control procedure performed by the combustion control apparatus according to this embodiment will be described in detail with reference to FIG. 7. FIG. 7 is a flow chart illustrating a routine for determining whether or not the combustion mode is set to the homogeneous charge combustion when the engine 10 is started. The steps illustrated in this flow chart are executed by the ECU 40 as an interruption process at predetermined time intervals.

Upon initiating the process, it is first determined whether or not the engine 10 is being started (whether or not cranking is being performed) (step 310). When it is determined here that the engine 10 is not being started (NO in step 310), the routine is temporarily terminated.

On the other hand, when it is determined that the engine 10 is being started (YES in step 310), it is determined whether the canister 31 has already adsorbed a large amount of fuel (step 320). The outcome of step 320 is positive when at least one of the following conditions (a) to (d) is satisfied.

(a) When the operation of the engine 10 is stopped and resumed after a heavy-load, high-speed operation:

In this condition, since the engine 10 is stopped after the fuel temperature has been raised due to the heavy-load, high-speed operation, a large amount of fuel vapor is produced per hour when the engine 10 is stopped, and that the canister 31 will have adsorbed a relatively large amount of fuel when the engine 10 is re-started.

This determination is made based on a load accumulated value SL stored in the memory 41 at the time of starting, i.e., the load accumulated value SL that was taken when the operation of the engine 10 was stopped. Specifically, it is determined that the starting condition (a) is satisfied when the load accumulated value SL is equal to or larger than the predetermined value.

(b) When the engine 10 is not in a low temperature state, and the engine 10 is started a long time period after the operation of the engine 10 was stopped:

In this condition, since the engine 10 is not in a low temperature state, and a long time period has elapsed since the operation was stopped, the total amount of fuel vapor produced during the stopped period is large, and the canister 31 has adsorbed a relatively large amount when the engine 10 is re-started.

This determination is made based on the cooling water temperature at the time of starting. Specifically, it is determined that the starting condition (b) is satisfied when a cooling water temperature lies within a predetermined range (here, in a range of zero to 40° C.). The basis of this determination is as follows. When the cooling water temperature is at 40° C. or higher when starting, it is determined that a short time period has elapsed since the operation of the engine 10 was stopped. On the other hand, when the cooling water temperature is at 0° C. or lower at the starting, it is determined that, although a long time period has elapsed since the operation of the engine 10 was stopped, it can be estimated from the extremely low cooling water temperature that the production of fuel vapor has not been promoted, and the canister 31 has not adsorbed a large amount of fuel.

(c) When the operation of the engine 10 is stopped and resumed while stratified charge combustion has been prohibited:

In this condition, since the operation of the engine 10 was stopped before the amount of adsorbed fuel in the canister 31 is reduced to the predetermined amount or less by carrying out purging to set the prohibition flag XPGSJ to OFF, a large amount of adsorbed fuel still remains in the canister 31 when the engine 10 is re-started.

This determination is made based on the prohibition flag XPGSJ stored in the memory 41 when starting the engine. Specifically, when the flag XPGSJ is ON, it is determined that the starting condition (c) is satisfied.

(d) When the engine 10 is started in a high temperature state:

This condition is met when the engine is re-started a short time period after it was stopped. In this event, after the engine 10 has been stopped, which stops the circulation of fuel, the fuel remaining in parts of the fuel feed system, such as the delivery pipe 25, high pressure pump 24, fuel feed passage 23, fuel return passage 26 and so on is rapidly heated by engine heat. Stated another way, in this case, the temperature of the fuel rises due to the lack of the cooling that occurs when the fuel is circulated. For this reason, a large amount of fuel vapor is produced while the engine 10 is stopped, causing a large amount of fuel to remain adsorbed in the canister 31 when the engine 10 is started.

This determination is made based on the cooling water temperature at the time of starting. Specifically, when the cooling water temperature is equal to or higher than the predetermined temperature (80° C. or higher), it is determined that starting condition (d) is satisfied.

When it is determined that any of the particular starting conditions (a) to (d) is satisfied (YES in step 320), the prohibition flag XPGSJ is set to ON (step 330), and the routine is temporarily terminated.

On the other hand, when it is determined that none of the particular starting conditions is satisfied (NO in step 320), the load accumulated value SL is reset to zero (step 340), and the process is terminated.

When the prohibition flag XPGSJ is set to ON through the sequence of processing steps, the combustion mode is set to homogeneous charge combustion until it is estimated that the amount of adsorbed fuel in the canister 31 has been reduced to the predetermined amount or less through the process illustrated in the flow charts of FIGS. 6(a) and 6(b).

This embodiment has the following advantages in addition to the advantages of the first embodiment.

In any of the particular starting conditions in which the canister 31 already has adsorbed a large amount of fuel when starting the engine 10, the adsorbed fuel can be promptly and reliably reduced, which avoids discharge of fuel vapor from the canister 31 to the atmosphere. Particularly, in this embodiment, it is possible to avoid discharging fuel vapor from the canister 31 to the atmosphere (a) when the operation of the engine 10 is stopped and resumed after a heavy-load, high-speed operation; (b) when the engine 10 is not in a low temperature state, and the engine 10 is started a long time period after the operation of the engine 10 was stopped; (c) when the operation of the engine 10 is stopped and resumed while the stratified charge combustion has been prohibited; and (d) when the engine 10 is started in a high temperature state.

[Third Embodiment]

Next, a third embodiment of the present invention will be described, centering on the differences between this embodiment and the second embodiment. In the second embodiment, stratified charge combustion is prohibited if the purged gas flow rate accumulated value SP(0) for the predetermined time period a and the sum ΣSP are below the decision values NL, NP. This embodiment differs from the second embodiment in the condition under which stratified charge combustion is prohibited.

Specifically, in this embodiment, a purged gas flow rate accumulated value (actual flow rate accumulated value SPGA) is first computed for the period from the time stratified charge combustion is prohibited to the time the concentration learned value FGPG becomes lower than the decision value JFGPG, and the subsequent period, in which stratified charge combustion is permitted (permission period TK), is set based on this accumulated value.

Then, in the period in which stratified charge combustion is permitted, a purged gas flow rate accumulated value (actual flow rate accumulated value SPHA) is computed. When the period expires, stratified charge combustion is prohibited if the accumulated value is below the required value (required flow rate accumulated value SPHD) based on the engine operating conditions and ambient temperature.

When the purged gas flow rate accumulated value exceeds the required value when the permission period expires, the permission period is further extended by the predetermined period (extension period ΔTK).

Figure 8A:
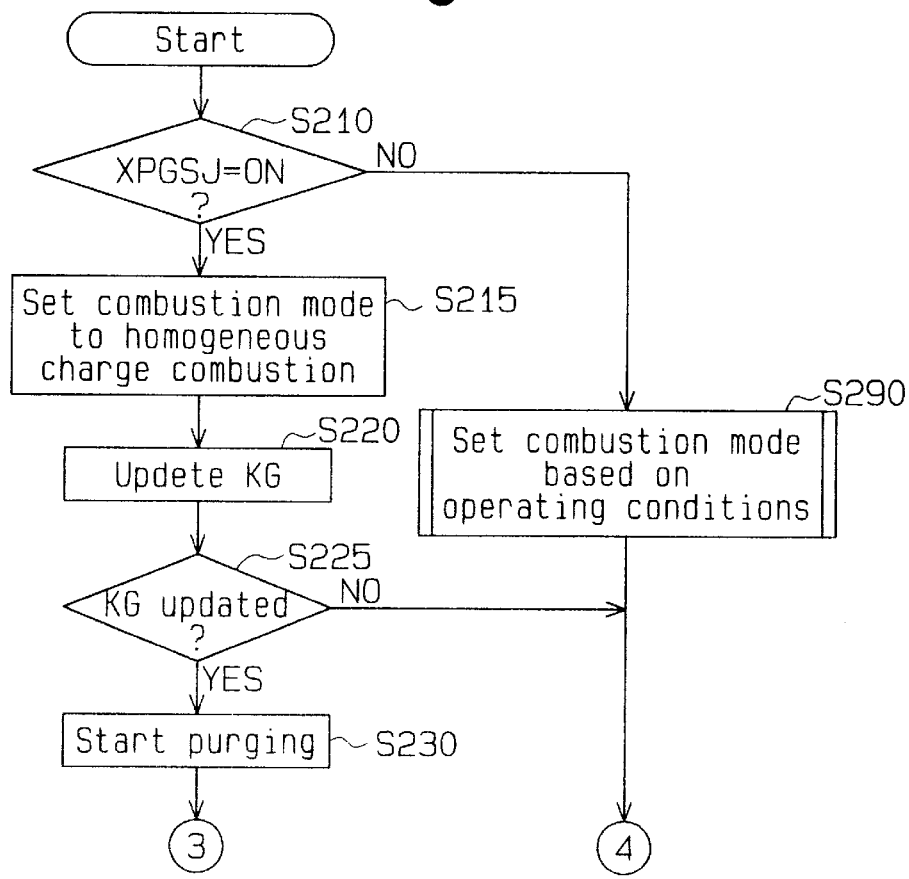
FIG. 8(a) is a flow chart illustrating a routine for permitting stratified charge combustion in a third embodiment of the present invention.
Figure 8:
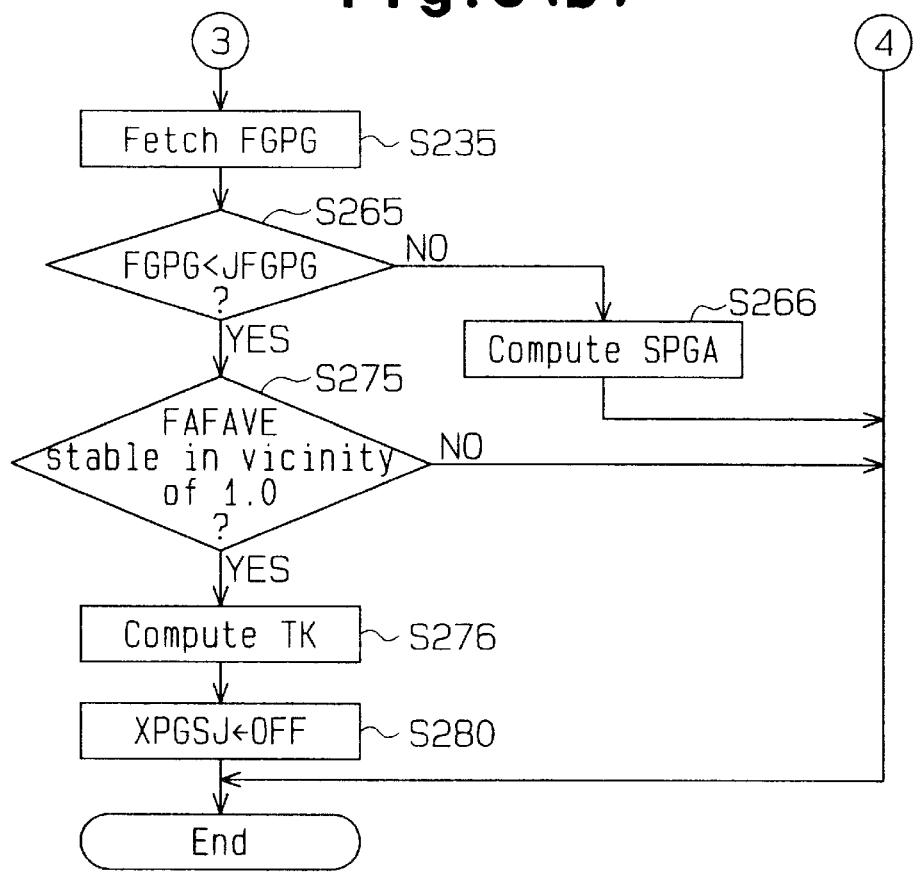
FIG. 8(b) is a flow chart illustrating later stages of the routine in FIG. 8(a)

A description of a routine for computing the permission period will follow with reference to FIGS. 8(a) through 10. FIGS. 8(a) and 8(b) are flow charts illustrating the permission period computation routine. The steps illustrated in the flow charts are executed by the ECU 40 as an interruption process, which is initiated at predetermined time intervals. Steps in FIGS. 8(a) and 8(b) designated with the same reference numerals as those in the FIGS. 6(a) and 6(b) are the same and will not be described again.

After purging is started after the air-fuel ratio learned value KG has been updated (step 230 in FIG. 8(a)), a purged gas concentration learned value FGPG is fetched (step 235 in FIG. 8(b)). Next, the concentration learned value FGPG is compared with the decision value JFGPG (step 265). When it is determined that the concentration learned value FGPG is equal to or larger than the decision value JFGPG (NO in step 265), an actual flow rate accumulated value SPGA is computed based on the following equation [11] (step 266), and the routine is temporarily terminated:

$$SPGA \leftarrow \text{current } SPGA + PQ \qquad [11]$$

where PQ is a purged gas flow rate.

Figure 9:
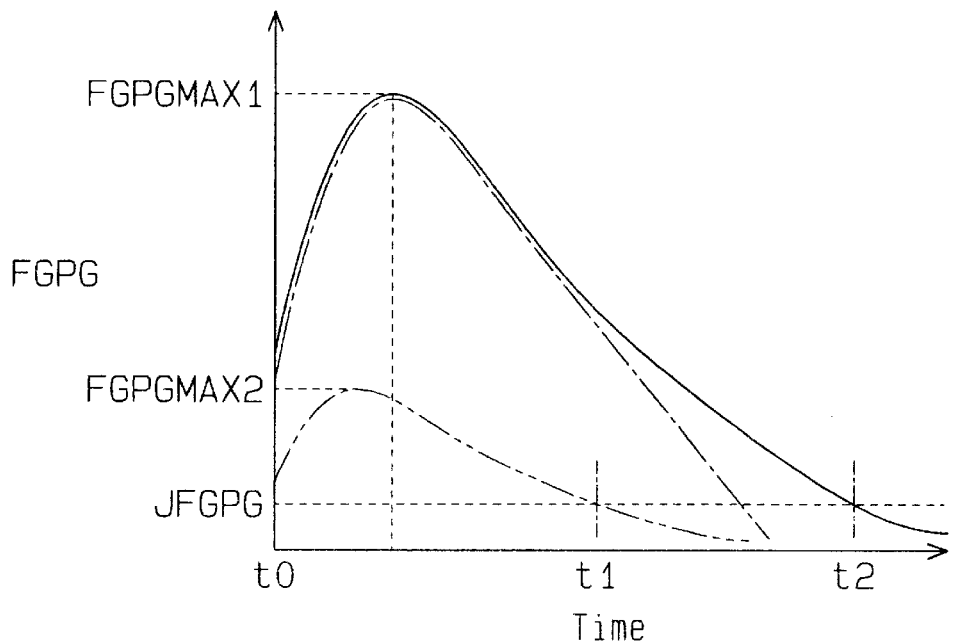
FIG. 9 is a timing chart illustrating, by way of example, a change in a concentration learned value.

FIG. 9 shows an example of a change in the concentration learned value FGPG after purging has been started. As indicated by a solid line in FIG. 9, when purging is started (at time t0), the concentration learned value FGPG abruptly increases to reach its maximum value (FGPGMAX1). Subsequently, the concentration learned value FGPG gradually decreases as the amount of adsorbed fuel in the canister 31 is reduced by purging and falls below the decision value JFGPG (after timing t2).

When a small amount of adsorbed fuel remains in the canister 31 when stratified charge combustion is prohibited, the concentration learned value FGPG changes in a manner indicated by a chain line having a series of one long and two short dashes in FIG. 9. Specifically, in this case, the concentration learned value FGPG has a lower maximum value (FGPGMAX2) and therefore requires a shorter time until it falls below the decision value JFGPG (the period between times t0 and t1).

Thus, the actual flow rate accumulated value SPGA increases as a larger amount of fuel is adsorbed in the canister 31 when stratified charge combustion is prohibited. On the other hand, when it is determined in step 265 that the concentration learned value FGPG is below the decision value JFGPG, i.e., when it is determined that the concentration of fuel in the purged gas is lower than the predetermined value (YES in step 265), it is determined whether or not the average value FAFAVE of the air-fuel ratio feedback coefficient FAF is stable in the vicinity of 1.0 (step 275). Then, when it is determined that the average value FAFAVE of the air-fuel ratio feedback coefficient FAF is stable in the vicinity of 1.0 (YES in step 275), the permission period TK is computed based on the actual flow rate accumulated value SPGA and the ambient temperature (step 276).

Figure 10:
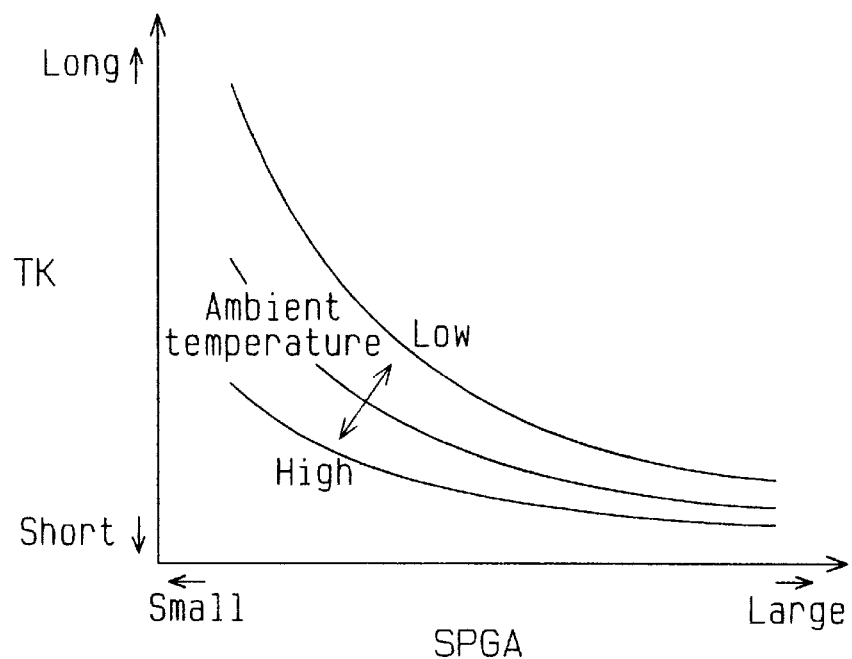
FIG. 10 is a map showing the relationship of a stratified charge combustion permission period to a purged gas flow rate accumulated value and the ambient temperature.

FIG. 10 shows a function map that is referred to in computing the permission period TK. As shown in FIG. 10, the permission period TK decreases as the actual flow rate accumulated value SPGA increases or as the ambient temperature increases. The permission period TK is set this way for the following reason.

When the actual flow rate accumulated value SPGA is large, and it is estimated that the canister 31 adsorbed a relatively large amount of fuel when stratified charge combustion was prohibited, the canister 31 is assumed to have no additional fuel adsorption capability and is likely to discharge fuel vapor to the atmosphere. Therefore, the time at which the stratified charge combustion is prohibited is late, and the permission period TK is therefore reduced to prohibit stratified charge combustion at an earlier time to prevent the discharge of fuel vapor.

On the other hand, when the actual flow rate accumulated value SPGA is small and it is estimated that the canister 31 has adsorbed a relatively small amount of fuel, it is assumed that the canister 31 has additional fuel adsorption capability when stratified charge combustion is prohibited. Thus, it is unlikely that fuel will be discharged to the atmosphere. In this case, therefore, the time at which stratified charge combustion is prohibited tends to be too early, and the permission period TK is thus increased to provide a sufficient period for performing stratified charge combustion to improves the fuel efficiency.

Further, as the ambient temperature increases, a larger amount of fuel vapor is produced in the fuel feed system, thus the permission period TK is reduced to prohibit stratified charge combustion at an earlier time to prevent the discharge of fuel vapor. As the ambient temperature decreases, a less fuel vapor is produced, and the permission period TK is thus increased to provide a sufficient period for performing stratified charge combustion.

Therefore, in this embodiment, the permission period TK is reduced as the actual flow rate accumulated value SPGA increases or as the ambient temperature increases. The relationship of the actual flow rate accumulated value SPGA to the ambient temperature and the permission period TK is predetermined through experiments and stored in the memory 41 of the ECU 40 as function data.

After computing the permission period TK, the prohibition flag XPGSJ is set to OFF to permit stratified charge combustion (step 280), and the routine is temporarily terminated.

Figure 11:
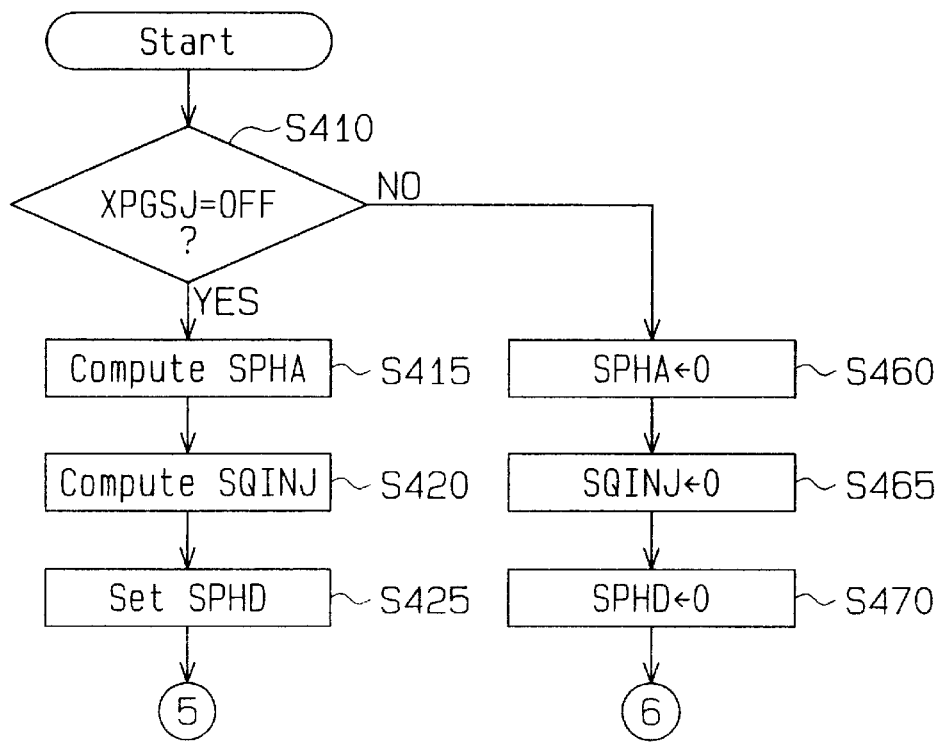
FIG. 11(a) is a flow chart illustrating a routine for prohibiting stratified charge combustion in the third embodiment of the present invention.
FIG. 11(b) is a flow chart illustrating later stages of the routine in FIG. 11(a)
Figure 11:
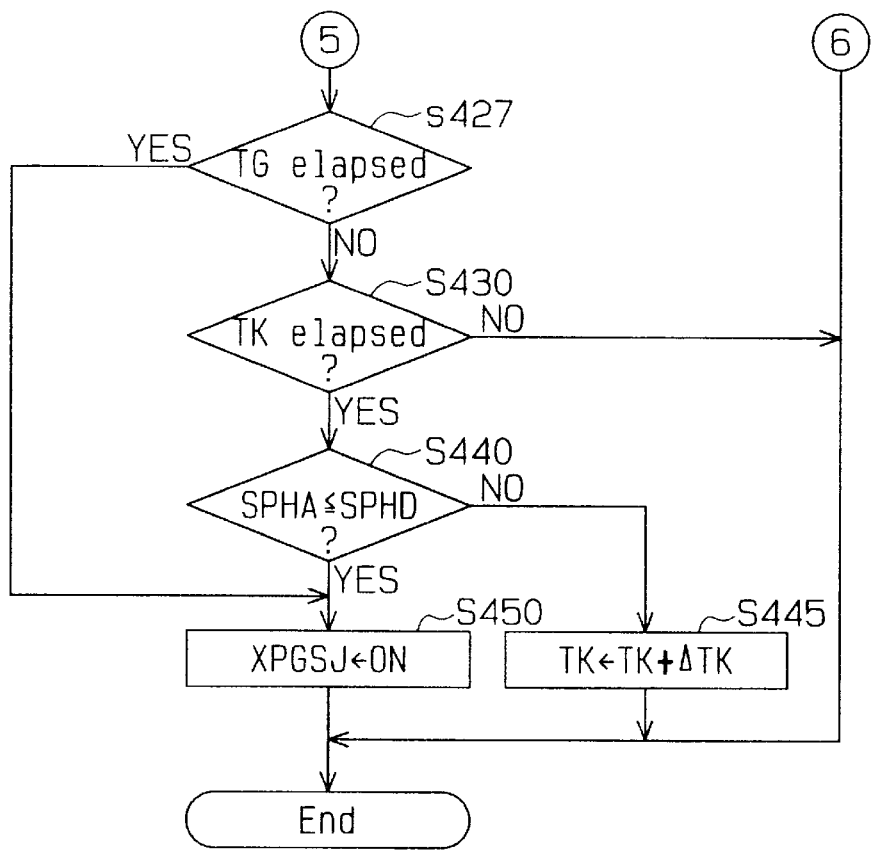

Next, a routine for prohibiting stratified charge combustion based on the permission period TK will be described with reference to FIGS. 11(a) through 12 and 14. FIGS. 11(a) and 11(b) are flow charts illustrating the routine for prohibiting stratified charge combustion. The steps illustrated in these flow charts are executed by the ECU 40 as an interruption process, which is initiated at predetermined time intervals.

It is first determined whether or not the prohibition flag XPGSJ is set to OFF (step 410). When the prohibition flag XPGSJ is set to OFF (YES in step 410), an accumulated value of purge flow rate (actual flow rate accumulated value SPHA) is computed based on the following equation [12] (step 415). The actual flow rate accumulated value SPHA indicates the amount of purged gas flow rate that has been accumulated since the prohibition flag XPGSJ was set to OFF to permit stratified charge combustion. In this embodiment, the capability of the fuel vapor treating mechanism 30 to treat fuel vapor is evaluated based on the actual flow rate accumulated value SPHA.

$$SPHA \leftarrow \text{current } SPHA + PQ \qquad [12]$$

In the equation [12], the purged gas flow rate PQ is similarly computed based on the atmospheric pressure corresponding to the intake air pressure and internal pressure of the canister 31 and an opening instruction value DPGR for the purge control valve 35.

Next, an accumulated value of fuel injected from the injector 12 (injection amount accumulated value SQINJ) is computed based on the following equation [13] (step 420):

$$SQINJ \leftarrow \text{current } SQINJ + TQ \qquad [13]$$

In the above equation [13], the amount TQ of injection per unit time indicates the total amount of fuel injected from the injector 12 per predetermined time (for example, ten seconds), and the predetermined time is fixed by the interruption cycle time of the routine. Thus, the injection amount accumulated value SQINJ is computed as the total amount of fuel injection from the time the prohibition flag XPGSJ was set OFF to permit stratified charge combustion.

Next, the required flow rate accumulated value SPHD is set based on the injection amount accumulated value SQINJ (step 425). The required flow rate accumulated value SPDH serves as a decision value for determining whether or not the actual flow rate accumulated value SPHA, i.e., the capability of the fuel vapor treating mechanism 30, is sufficient for the particular fuel vapor production.

Also, the required flow rate accumulated value SPHD increases as the injection amount accumulated value SQINJ increases. When the injection amount accumulated value SQINJ is relatively large, it is assumed that the temperature of the engine 10 and the exhaust system thereof are high due to combustion heat generated in the combustion chamber 11 and that the temperature of the fuel has also been raised by such heat, which results in more fuel vapor produced in the fuel feed system. In this case, therefore, the fuel vapor treating mechanism 30 is required to have higher capability, and the required flow rate accumulated value SPHD is set to a relatively large value. The relationship between the required flow rate accumulated value SPHD and the injection amount accumulated value SQINJ is predetermined through experiments and stored in the memory 41 of the ECU 40.

After computing the actual flow rate accumulated value SPHA and the required flow rate accumulated value SPHD, it is determined whether or not the predetermined determination period TG has elapsed after stratified charge combustion is permitted (step 427 in FIG. 11(b)).

Figure 12:
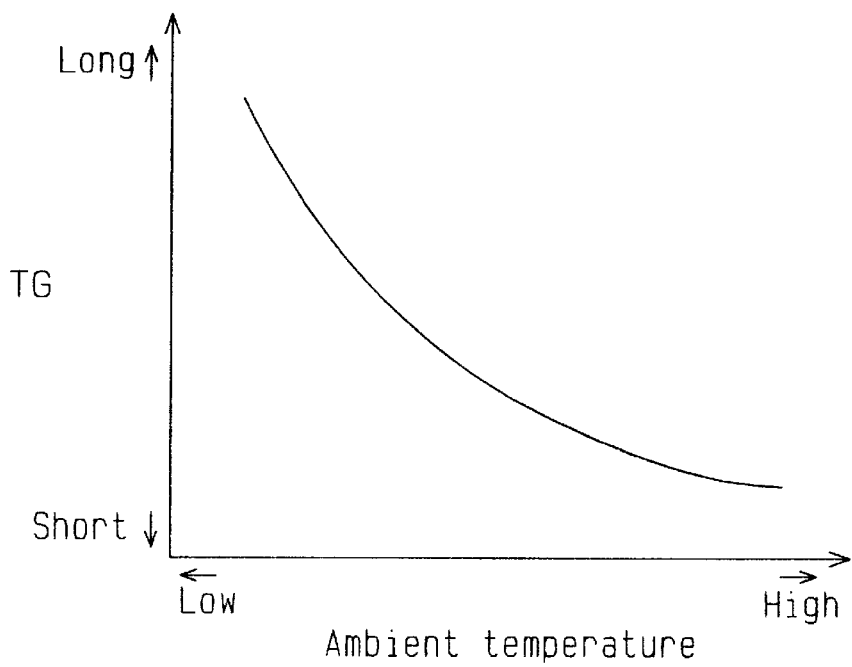
FIG. 12 is a map showing the relationship between a determination period and the ambient temperature.

The determination period TG is set based on the ambient temperature. FIG. 12 is a function map showing the relationship between the determination period TG and the ambient temperature. As shown in FIG. 12, the determination period TG decreases as the ambient temperature increases, i.e., as a larger amount of fuel vapor is produced. The relationship between the determination period TG and the external air temperature is predetermined through experiments, and stored in the memory 41 of the ECU 40.

When it is determined that the determination period TG has elapsed after stratified charge combustion was permitted (YES in step 427), the prohibition flag XPGSJ is set to ON (step 450). Thus, in this embodiment, stratified charge combustion is prohibited and the combustion mode is set to homogeneous charge combustion when the determination period TG has elapsed after stratified charge combustion was permitted, even when the permission period TK is set to a relatively long period, or even when the permission period TK has been extended.

On the other hand, when it is determined that the determination period TG has not elapsed (NO in step 427), it is determined whether or not the permission period TK has elapsed since stratified charge combustion was permitted (step 430). When it is determined that the permission period TK has elapsed (YES in step 430), the actual flow rate accumulated value SPHA is compared with the required flow rate accumulated value SPHD (step 440). Then, when the actual flow rate accumulated value SPHA is equal to or smaller than the required flow rate accumulated value SPHD (YES in step 440), in other words, when the capability of the fuel vapor treating mechanism 30 is not sufficient for a particular fuel vapor production, (the canister 31 is determined to have no additional fuel adsorption capability) the prohibition flag XPGSJ is set to ON to prohibit stratified charge combustion (step 450).

Also, when it is determined that the actual flow rate accumulated value SPHA exceeds the required flow rate accumulated value SPHD, although the permission period TK has elapsed (NO in step 440), i.e., when it is determined that the fuel vapor treating mechanism 30 has sufficient capability for a particular fuel vapor production, and the canister 31 has additional fuel adsorption capability, the permission period TK is updated based on the following equation [14] to extend the permission period TK (step 445):

$$TK \leftarrow [\text{current } TK] + \Delta TK \qquad [14]$$

Figure 14:
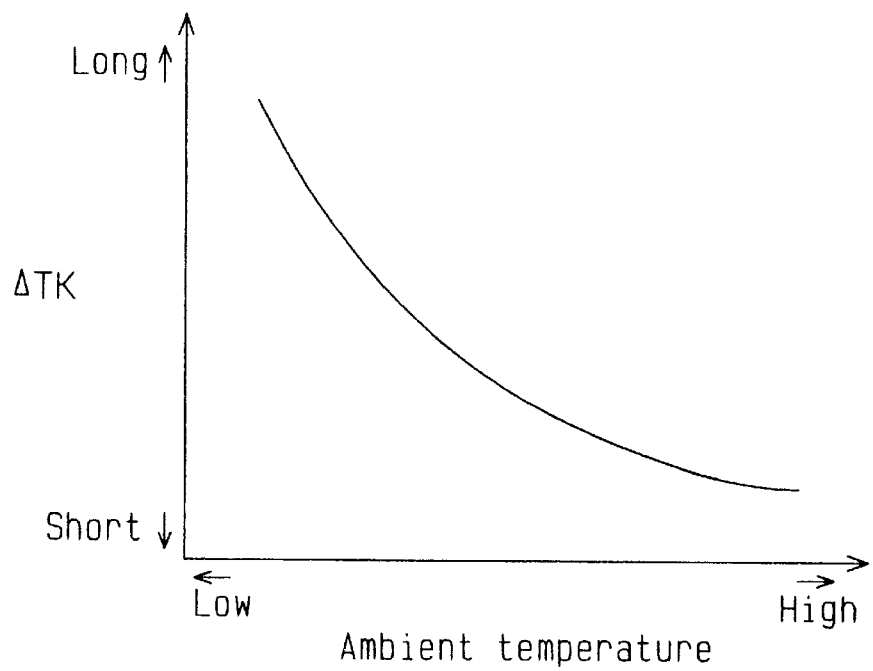
FIG. 14 is a map showing the relationship between an extension period and the ambient temperature.

In the above equation [14], the extension period $\Delta TK$ is set based on the ambient temperature. FIG. 14 is a function map showing the relationship between the ambient temperature and the extension period $\Delta TK$ as described above. As shown in FIG. 14, the extension period $\Delta TK$ decreases as the ambient temperature increases, i.e., as a larger amount of fuel vapor is produced, to prevent the amount of adsorbed fuel in the canister 31 from reaching its limit within the extended permission period TK. Similarly, the extension period $\Delta TK$ is set to a relatively shorter period than the permission period TK before extension to prevent the amount of adsorbed fuel in the canister 31 from reaching its limit within the permission period TK. The relationship between the extension period $\Delta TK$ and the ambient temperature is predetermined through experiments and stored in the memory 41 of the ECU 40.

Turning back to step 410 in FIG. 11(a), when it is determined that the prohibition flag XPGSJ is ON (NO in step 410), the actual fuel accumulated value SPHA, fuel amount accumulated value SQINJ, and required flow rate accumulated value SPHD are set to zero, respectively (steps 460, 465, 470), and the routine is temporarily terminated. When it is determined in step 430 that the permission period TK has not elapsed (NO in step 430), the routine is temporarily terminated after steps 445, 450 have been executed.

This embodiment has the following advantages.

The actual flow rate accumulated value SPHA corresponding to the actual performance capability of the fuel vapor treating mechanism 30 is compared with the required flow rate accumulated value SPHD corresponding to the required capability, and stratified charge combustion is prohibited if the actual flow rate accumulated value SPHA is equal to or smaller than the required flow rate accumulated value SPHD. Thus, opportunities for performing stratified charge combustion are not unnecessarily limited. It is therefore possible to provide as many opportunities as possible to perform stratified charge combustion to improve fuel efficiency.

Since the actual capability of the fuel vapor treating mechanism 30 is evaluated by the actual flow rate accumulated value SPHA, the capability of the fuel vapor treating mechanism 30 is estimated more appropriately, as in the first embodiment.

The required flow rate accumulated value SPHD for determining whether or not the capability of the fuel vapor treating mechanism 30 meets the required capability is set based on the injection amount accumulated value SQINJ. Thus, the required flow rate accumulated value SPHD is set in accordance with the amount of produced fuel vapor which varies in response to the temperature of the engine 10 and the exhaust system. Thus the result of the comparison between the required flow rate accumulated value SPHD and the actual flow rate accumulated value SPHA is more reliable.

Since the actual flow rate accumulated value SPHA is computed based on the intake air pressure, the atmospheric pressure, and the opening instruction value DPGR for the purge control valve 35, the actual flow rate accumulated value SPHA can be precisely computed even when exhaust gas is recirculated by the EGR mechanism.

After stratified charge combustion is permitted, it is determined whether or not the permission period TK has elapsed, and the combustion mode is prohibited from being switched from stratified charge combustion to homogeneous charge combustion when the permission period TK has not elapsed. Unnecessary switching of the combustion mode to homogeneous charge combustion is thus prevented, which improves the fuel efficiency.

The amount of adsorbed fuel in the canister 31 is estimated when stratified charge combustion is prohibited, and the permission period TK is decreases as the estimated amount of adsorbed fuel increases. Therefore, the permission period TK can be set in accordance with the margin of the fuel adsorption capability in the canister 31, thereby simultaneously limiting the discharge of fuel vapor and improving the fuel efficiency.

The actual flow rate accumulated value SPGA is computed for a period from when stratified charge combustion is prohibited to the time the concentration learned value FGPG becomes smaller than the decision value JFGPG. Based on the actual flow rate accumulated value SPGA, the amount of adsorbed fuel in the canister 31 when the stratified charge combustion is prohibited is estimated, so that the amount of adsorbed fuel can be appropriately estimated.

Since the permission period TK is set to a relatively shorter period as the ambient temperature increases, the permission period TK is set in accordance with the amount of produced fuel vapor.

When the actual flow rate accumulated value SPHA exceeds the required flow rate accumulated value SPDH, the permission period TK is extended by an extension period ΔTK. Therefore, when it is determined that the canister 31 still has additional fuel adsorption capability, the permission period TK is extended by providing fuel vapor treatment capability to accommodate the fuel vapor produced in the extended permission period. Likewise, in this respect, unnecessary switching of the combustion mode to homogeneous charge combustion is prevented, which improves the fuel efficiency while limiting the discharge of fuel vapor to the atmosphere.

Since the extension period ΔTK is set to a relatively shorter period than the permission period TK before the extension, it is possible to avoid increasing the amount of adsorbed fuel in the canister 31 beyond a limit amount within the extended permission period TK to limit the discharge of fuel vapor to the atmosphere.

Since the extension period ΔTK is set to a relatively shorter period as the ambient temperature increases, the extension period ΔTK is set in accordance with the amount of produced fuel vapor.

Stratified charge combustion is prohibited to switch the combustion mode to homogeneous charge combustion when the determination period TG has elapsed, even when the permission period TK is set to a relatively long period, or even when the permission period TK has been extended based on the extension period ΔTK. Thus, even if stratified charge combustion is not prohibited for a long time period as a result of erroneously over estimating the capability of the fuel vapor treating mechanism due to inaccuracy of the computed actual flow rate accumulated value SPHA and required flow rate accumulated value SPHD, the combustion mode is switched to homogeneous charge combustion when the determination period TG elapses. This limits the discharge of fuel vapor to the atmosphere.

Since the determination period TG is set based on the ambient temperature, the determination period TG is set in accordance with the amount of produced fuel vapor, thereby limiting the discharge of fuel vapor to the atmosphere and preventing unnecessary switching of the combustion mode to the homogeneous charge combustion.

[Fourth Embodiment]

Next, a fourth embodiment of the present invention will be described, centering on the differences between this embodiment and the third embodiment. In the third embodiment, the amount of adsorbed fuel in the canister 31 when the stratified charge combustion is prohibited is estimated based on the actual flow rate accumulated value SPGA. However, the amount of adsorbed fuel tends to vary in correlation with a maximum value of the concentration learned value FGP, other than the actual flow rate accumulated value SPGA, as mentioned above. As shown in FIG. 9, the maximum values (FGPGMAX1, FGPGMAX2) of the concentration learned value FGPG tend to increase as the amount of adsorbed fuel increases.

Also, the concentration learned value FGPG varies in a stable manner until it rises to the vicinity of the maximum value, and corresponds directly to the amount of adsorbed fuel in the canister 31 when stratified charge combustion is prohibited. On the contrary, when the concentration learned value FGPG falls to the vicinity of the decision value JFGPG, it tends to vary in an unstable manner.

For example, even with the same amount of adsorbed fuel in the canister 31 when the stratified charge combustion is prohibited, the concentration learned value FGPG may reach the decision value JFGPG at a relatively early time in some cases, as indicated by a chain line having alternating long and short dashes in FIG. 9. On the contrary, in other cases, although the concentration learned value FGPG decreases to the vicinity of the decision value JFGPG, it may decrease at a lower speed so that it takes a long time to reach the decision value JFGPG. In these situations, there is a fear that the reliability of the result of estimation of the amount of adsorbed fuel will deteriorate.

To eliminate this concern, this embodiment detects a maximum value of the concentration learned value FGPG after the stratified charge combustion is prohibited and estimates the amount of adsorbed fuel based on the detected maximum value.

Figure 13:
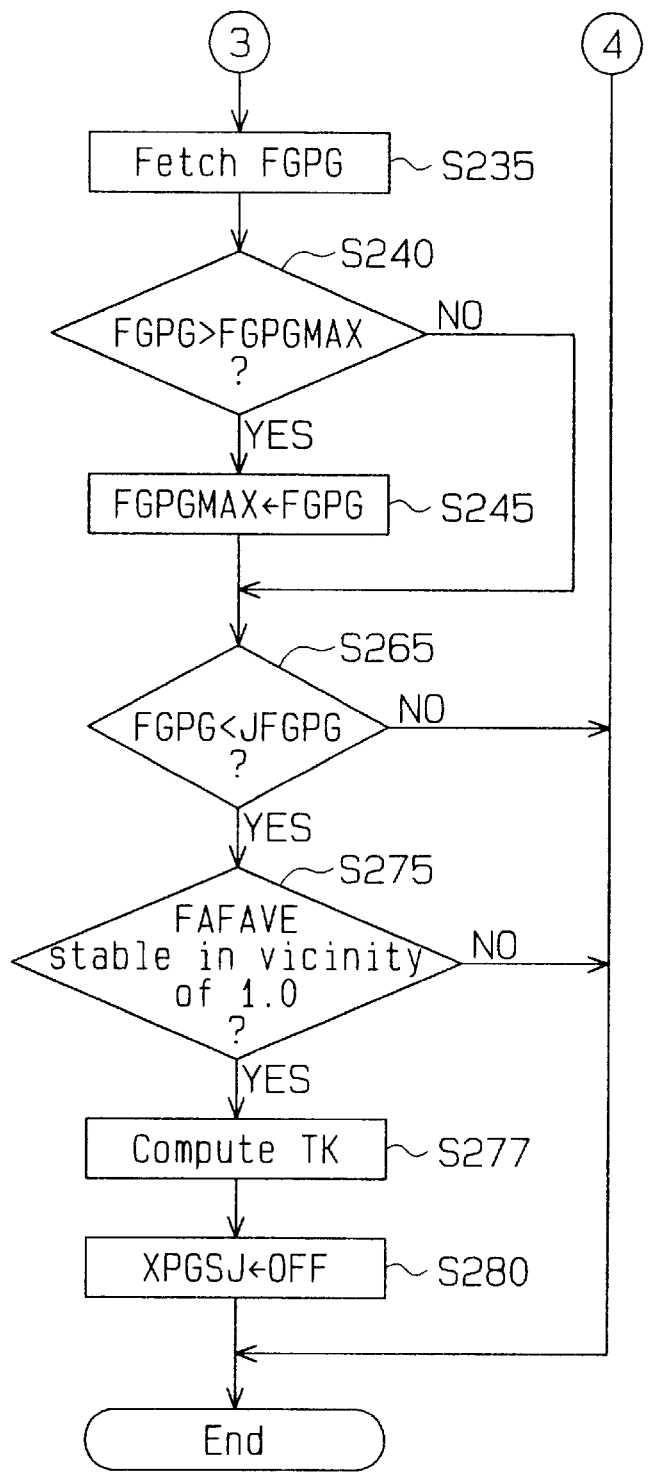
FIG. 13 is a flow chart illustrating a routine for permitting the execution of stratified charge combustion in a fourth embodiment of the present invention.
Figure 15:
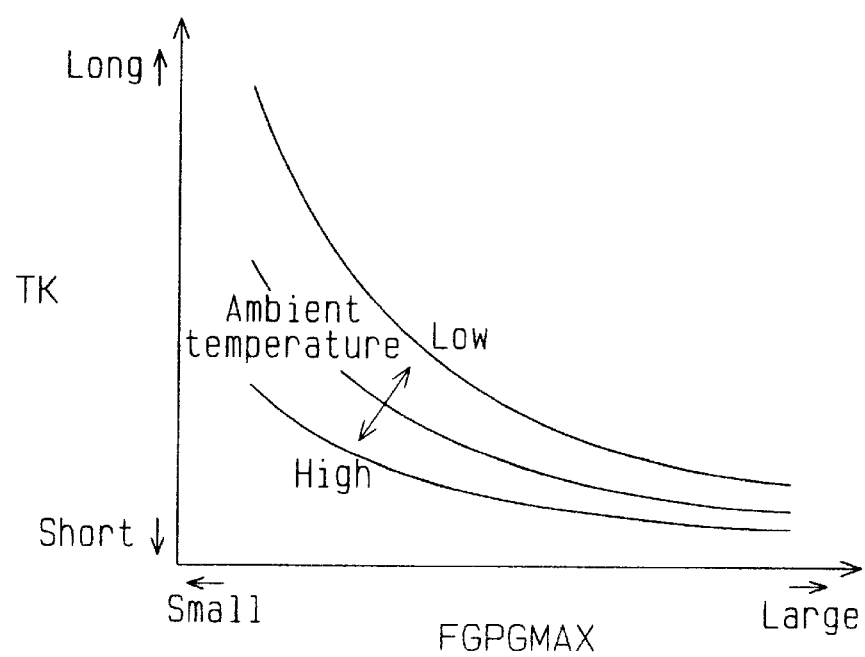
FIG. 15 is a map showing the relationship of a stratified charge combustion permission period to a maximum learned concentration value and the ambient temperature.

A description of routine for estimating the amount of adsorbed fuel in the canister 31 based on the maximum value of the concentration learned value FGPG will follow with reference to FIGS. 13 and 15.

FIG. 13 is a flow chart illustrating only the steps of FIGS. 8(a) and 8(b) that differ from the third embodiment. Likewise, in the routine illustrated in this flow chart, steps in FIG. 13 that are designated with the same reference numerals as those in FIGS. 8(a) and 8(b) are the same and will not be described again.

After the concentration learned value FGPG is fetched (step 235), the concentration value FGPG is compared with a maximum value FGPGMAX of fetched concentration learned values FGPG (step 240). Then, when the current concentration learned value FGPG is larger than the maximum value FGPGMAX (YES in step 240), the currently fetched concentration learned value FGPG is updated and saved as a new maximum value FGPGMAX (step 245). On the other hand, when the current concentration learned value FGPG is equal to or smaller than the maximum value FGPGMAX (NO in step 240), the maximum value FGPGMAX is not updated.

Next, when it is determined that the concentration learned value FGPG is smaller than the decision value JFGPG and that an average value FAFAVE of an air-fuel ratio feedback coefficient FAF is stable in the vicinity of 1.0 (YES in steps 265, 275), a permission period TK is computed based on the maximum value FGPGMAX of the concentration learned value FGPG and the ambient temperature (step 277).

FIG. 15 is a function map showing the relationship of the maximum value FGPGMAX to the ambient temperature and the permission period TK. As shown in FIG. 15, the permission period TK is set to a relatively shorter period as the maximum value FGPGMAX of the concentration learned value FGPG is larger, or as the ambient temperature increases. This setting is based on a reason similar to that for which the relationship of the actual flow rate accumulated value SPGA to the ambient temperature and the permission period TK is established in the manner described above.

Specifically, when the maximum value FGPGMAX of the concentration learned value FGPG is large and it is estimated that the canister 31 has adsorbed a relatively large amount of fuel when stratified charge combustion is prohibited, the time at which stratified charge combustion was prohibited is late. Therefore, the permission period TK is reduced to prohibit stratified charge combustion at an earlier time. On the other hand, when the maximum value FGPGMAX of the concentration learned value FGPG is small and it can be estimated that the canister 31 has adsorbed a relatively small amount of fuel when stratified charge combustion is prohibited, the time at which stratified charge combustion was prohibited tends to be too early. In this case, therefore, the permission period TK is increased. The relationship of the maximum value FGPGMAX of the concentration learned value FGPG to the ambient temperature and the permission period TK is predetermined through experiments and stored in the memory 41 of the ECU 40 as function data.

After computing the permission period TK, the prohibition flag XPGSJ is set to OFF (step 280), and the process is temporarily terminated.

This embodiment has the following advantages.

The maximum period FGPGMAX of the concentration learned value FGPG is detected in a period from the time stratified charge combustion is prohibited to the time the concentration learned value FGPG becomes smaller than the decision value JFGPG. Based on the maximum value FGPGMAX, the amount of fuel adsorbed in the canister 31 when the stratified charge combustion was prohibited is estimated, so that the amount of adsorbed fuel can be appropriately estimated while limiting the adverse influence of an unstable change.

The foregoing respective embodiments may be modified as follows.

While in the first and second embodiments, the capability of the fuel vapor treating mechanism 30 is evaluated based on the purged gas flow rate accumulated values ΣSP, SP(0) for the predetermined period, the performance capability may be evaluated, for example, based on the purged gas flow rate itself, or an average value of the purged gas flow rate for the predetermined time period. Similarly, in the third and fourth embodiments, the capability of the fuel vapor treating mechanism 30 may be evaluated based on the purged gas flow rate itself, or an average value of the purged gas flow rate for the predetermined time period TK. In addition, the permission period TK may be extended when the average value of the purged gas flow rate is larger than a decision value that is set in accordance with the amount of produced fuel vapor.

While in the first and second embodiments, the respective decision values NP, NL are set based on the atmospheric pressure in addition to the ambient temperature and the load accumulated value SL, these decision values NP, NL may be set based only on the ambient temperature and the load accumulated value SL.

In the first and second embodiments, the second decision value NL is set based only on the load accumulated value SL and the atmospheric pressure. Alternatively, the ambient temperature, for example, may be referred to in setting the second decision value NL, such that the second decision value NL decreases as the external air temperature decreases when the ambient temperature is equal to or lower than the predetermined temperature, in which case the assumption is made that the fuel temperature is prevented from elevating.

In the third and fourth embodiments, the permission period is computed based on the ambient temperature in addition to the actual flow rate accumulated value SPGA. Alternatively, the permission period TK may be computed, for example, based on engine operating conditions such as an injection amount accumulated value for a period from the time stratified charge combustion is prohibited to the time it is again permitted, or the like, in place of the ambient temperature. Further, the extension period ΔTK and the determination period TG may be computed, for example, based on engine operating conditions such as the injection amount accumulated value or the like. Even with such modification, any of the permission period TK, extension period ΔTK and determination period TG can be set in accordance with the amount of produced fuel vapor, which may vary depending on the temperature in the engine 10 and its exhaust system.

Further, any of these permission period TK, extension period ΔTK and determination period TG may be corrected in accordance with the atmospheric pressure. In this way, the permission period TK, extension period ΔTK or determination period TG can be set in accordance with the amount of produced fuel vapor, which may vary depending on the rate at which the fuel vapor is evaporated. Alternatively, these periods TK, ΔTK, TG may be set as fixed periods.

Further, in the embodiments described above, the ambient temperature detected by the ambient temperature sensor 57 is referred to in computing the respective decision values NP, NL, permission period TK, extension period ΔTK, and determination period TG, respectively. The ambient temperature may be replaced, for example, with an intake air temperature in the intake air passage 14 detected by an intake air temperature sensor. In this case, an intake air temperature at the time of starting the engine, or a minimum intake temperature during an engine operation is desirably used as a substitute for the ambient temperature. Further alternatively, the ambient temperature may be estimated based on a cooling water temperature, other than the intake air temperature, to substitute the estimated temperature for the ambient temperature.

In the third embodiment, the permission period TK is set based on a purged gas flow rate accumulated value (actual flow rate accumulated value SPGA) for a period from the time stratified charge combustion is prohibited to the time the concentration learned value FGPG falls below the decision value JFGPG as well as the ambient temperature. In place of the purged gas flow rate accumulated value, an average value thereof may be computed based on that average value to set the permission period TK.

In the first and second embodiments, similar to the third and fourth embodiments, the stratified charge combustion may be prohibited to switch the combustion mode to the homogeneous charge combustion when the predetermined determination period has elapsed after stratified charge combustion permitted.

While in the third and fourth embodiments, the extension period ΔTK is set based only on the ambient temperature, the extension period ΔTK may be set shorter, for example, each time the permission period TK is extended based on the extension period ΔTK.

In the respective embodiments described above, all the conditions such as (condition 1) that the concentration learned value FGPG is below the predetermined decision value JFGPG (step 265 in FIG. 6(*b*)); (condition 2) that the actual flow rate accumulated value SPFA exceeds the required flow rate accumulated value SPFD (step 270); and (condition 3) that the average value FAFAVE of the air-fuel ratio feedback coefficient FAF is stable in the vicinity of 1.0 (step 275) are set as conditions under which the prohibition flag XPGSJ is set to OFF to permit stratified charge combustion. Alternatively, any combination of such conditions for permitting stratified charge combustion may be selected, for example, from only one of the condition 1 and condition 2; condition 1 and condition 2; condition 1 and condition 3; and condition 2 and condition 3.

While the respective embodiments described above assume an engine that sets the fuel injection timing in the latter period of the compression stroke for carrying out stratified charge combustion (full stratified charge combustion), the combustion control apparatus according to the present invention may be applied, for example, to an engine that injects fuel separately in a suction stroke and in a compression stroke to reduce the magnitude of stratified charge (semi stratified charge combustion) in addition to the full stratified charge combustion as mentioned. Also, the combustion control apparatus according to the present invention may be applied to an engine that performs, as homogeneous charge combustion, combustion with an air-fuel ratio set leaner than the stoichiometric air-fuel ratio (homogeneous charge lean combustion) as well as combustion with an air-fuel ratio set at the stoichiometric air-fuel ratio (homogeneous charge stoichiometric combustion).

The present examples and embodiments are to be considered as illustrative and not restrictive and the invention is not to be limited to the details given herein, but may be modified within the scope and equivalence of the appended claims.

What is claimed is:

1. An engine that operates in a combustion mode selected from a stratified charge combustion mode and a homogeneous charge combustion mode, wherein the engine comprises:

a fuel vapor treating mechanism, wherein the treating mechanism has a canister, which adsorbs fuel vapor produced in a fuel feed system of the engine, wherein the treating mechanism purges the fuel vapor adsorbed by the canister, along with air, to an intake system of the engine; and a controller for controlling the treating mechanism to adjust a flow rate of purged gas in accordance with a running state of the engine, wherein the controller computes the flow rate of the purged gas and computes a capability value based on the computed flow rate of the purged gas, the capability value representing the capability of the treating mechanism to treat fuel-vapor, wherein the controller sets a decision value in accordance with an amount of fuel vapor produced in the fuel feed system, the decision value representing a required capability of the treating mechanism, and wherein, when the capability value is less than the decision value, the controller prohibits stratified charge combustion, which causes the engine to perform homogeneous charge combustion.

2. A combustion control apparatus of an engine having a fuel vapor treating mechanism, wherein the treating mechanism has a canister, which adsorbs fuel vapor produced in a fuel feed system of the engine, and the treating mechanism purges the fuel vapor adsorbed by the canister, along with air, to an intake system of the engine, wherein a flow rate of the purged gas is adjusted in accordance with a running state of the engine, and the engine operates in a combustion mode selected from a stratified charge combustion, mode and a homogeneous charge combustion mode, the apparatus comprising:

computing means for computing the flow rate of the purged gas and computing a capability value based on the computed flow rate of the purged gas, the capability value representing the capability of the treating mechanism to treat fuel vapor, setting means for setting a decision value in accordance with an amount of fuel vapor produced in the fuel feed system, the decision value representing a required capability of the treating mechanism; and control means, wherein, when the capability value is less than the decision value, the control means prohibits stratified charge combustion, which causes the engine to perform homogeneous charge combustion.

3. The combustion control apparatus according to claim 2, wherein the computing means computes an accumulated or average flow rate of purged gas over a predetermined period, wherein the capability value is the accumulated or average flow rate.

4. The combustion control apparatus according to claim 2, wherein the setting means sets the decision value based on an ambient temperature.

5. The combustion control apparatus according to claim 4, wherein the setting means takes an atmospheric pressure into account when setting the decision value.

6. The combustion control apparatus according to claim 2, wherein the setting means sets the decision value based on the running state of the engine.

7. The combustion control apparatus according to claim 6, wherein the setting means takes an atmospheric pressure into account when setting the decision value.

8. The combustion control apparatus according to claim 2, wherein the treating mechanism includes a control valve, which is located in a purge passage that connects the canister to the intake system, wherein the control valve regulates the flow rate of the purged gas, and wherein the computing means computes the flow rate of the purged gas based on a pressure in the intake system, an atmospheric pressure and an opening size of the control valve.

9. The combustion control apparatus according to claim 2, wherein the capability value is a first capability value and the computing means computes a second capability value, wherein the computing means computes the first capability value by taking the flow rate of purged gas over a predetermined first period into account and computes the second capability value by taking the flow rate of purged gas over a second period, which is shorter than the first period, into account;
    wherein the decision value is a first decision value and the setting means sets a second decision value, wherein the first decision value corresponds to the first capability value and the second decision value corresponds to the second capability value, wherein the setting means sets the first decision value based on an ambient temperature and sets the second decision value based on the running state of the engine; and
    wherein, when at least one of the first and second capability values is less than the corresponding decision value, the control means prohibits stratified charge combustion.

10. The combustion control apparatus according to claim 1, wherein the control means permits stratified charge combustion to be performed when a predetermined period has elapsed after prohibiting stratified charge combustion.

11. The combustion control apparatus according to claim 10, wherein the control means permits stratified charge combustion to be performed when the amount of fuel adsorbed by the canister is less than a predetermined value after prohibiting stratified charge combustion.

12. The combustion control apparatus according claim 10, wherein, while homogenous charge combustion is being performed subsequent to the prohibition of stratified charge combustion, the control means computes the concentration of fuel in the purged gas based on a deviation of the actual air-fuel ratio from the stoichiometric air-fuel ratio due to the purged gas, and wherein the control means permits stratified charge combustion to be performed when the computed fuel concentration is smaller than a predetermined value.

13. The combustion control apparatus according to claim 12, wherein, while homogenous charge combustion is being performed subsequent to the prohibition of stratified charge combustion, the control means compensates for deviation between the actual air-fuel ratio and the stoichiometric air-fuel ratio while temporarily stopping purging prior to the computation of the fuel concentration in the purged gas.

14. The combustion control apparatus according to claim 12, wherein, when the actual air-fuel ratio is unstable in the vicinity of the stoichiometric air-fuel ratio, the control means continues to perform homogeneous charge combustion and prohibits stratified charge combustion.

15. The combustion control apparatus according to claim 10, wherein, until a predetermined permission period elapses after permitting stratified charge combustion, the control means continues to permit stratified charge combustion regardless of whether the capability value is less than the decision value.

16. The combustion control apparatus according to claim 15, wherein the control means sets the permission period based on at least one of an ambient temperature and the running state of the engine.

17. The combustion control apparatus according to claim 15, wherein the control means sets the permission period based on the amount of fuel adsorbed by the canister when stratified charge combustion is prohibited.

18. The combustion control apparatus according claim 15, wherein, while homogenous charge combustion is being performed subsequent to the prohibition of stratified charge combustion, the control means computes the concentration of fuel in the purged gas based on a deviation of the actual air-fuel ratio from the stoichiometric air-fuel ratio due to the purged gas, and wherein the control means sets the permission period by taking the flow rate of purged gas from when stratified charge combustion is prohibited to when the computed fuel concentration is less than a predetermined value into account.

19. The combustion control apparatus according claim 15, wherein, while homogenous charge combustion is being performed subsequent to the prohibition of stratified charge combustion, the control means computes the maximum value of the concentration of fuel in the purged gas based on a deviation of the actual air-fuel ratio from the stoichiometric air-fuel ratio due to the purged gas, and wherein the control means sets the permission period based on the computed maximum value.

20. The combustion control apparatus according to claim 15, wherein, if the capability value is greater than the decision value during the permission period, the control means extends the permission period by a predetermined extension period.

21. The combustion control apparatus according to claim 20, wherein the control means takes the flow rate of purged gas over the permission period into account when computing the capability value.

22. The combustion control apparatus according to claim 20, wherein the extension period is shorter than the permission period.

23. The combustion control apparatus according to claim 20, wherein the control means sets the extension period based on at least one of an ambient temperature and the running state of the engine.

24. The combustion control apparatus according to claim 2, wherein, when a predetermined determination period has elapsed while stratified charge combustion was permitted, the control means forces the engine to perform homogeneous charge combustion.

25. The combustion control apparatus according to claim 24, wherein the control means sets the determination period based on at least one of an ambient temperature and the running state of the engine.

26. The combustion control apparatus according to claim 2, wherein, if the engine is started with a relatively great amount of fuel adsorbed by the canister, the control means causes the engine to perform homogeneous charge combustion until the amount of adsorbed fuel becomes smaller than a predetermined value.

27. The combustion control apparatus according to claim 26, wherein the control means determines that the engine is started with a relatively great amount of fuel adsorbed by the canister if the control means judges either that the state of the engine before being started tended to promote fuel vapor production or that stratified charge combustion was prohibited the last time the engine was stopped.

28. A method for controlling an engine that operates in a combustion mode selected from a stratified charge combustion mode and a homogeneous charge combustion mode, the method comprising:

adsorbing fuel vapor produced in a fuel feed system of the engine by a canister of a fuel vapor treating mechanism;

purging the fuel vapor adsorbed by the canister, along with air, to an intake system of the engine;

adjusting a flow rate of the purged gas in accordance with a running state of the engine;

computing the flow rate of the purged gas; computing a capability value based on the computed flow rate of the purged gas, the capability value representing the capability of the treating mechanism;

setting a decision value in accordance with an amount of the fuel vapor produced in the fuel feed system, the decision value representing a required capability of the treating mechanism; and prohibiting stratified charge combustion and causing the engine to perform homogeneous charge combustion when the capability value is less than the decision value.

* * * * *

UNITED STATES PATENT AND TRADEMARK OFFICE
CERTIFICATE OF CORRECTION

PATENT NO.   : 6,505,599 B1
DATED        : January 14, 2003
INVENTOR(S)  : Zenichiro Mashiki et al.

It is certified that error appears in the above-identified patent and that said Letters Patent is hereby corrected as shown below:

Column 27,
Line 39, change the dependency of claim 10 from "claim 1" to -- claim 2 --.

Signed and Sealed this

Sixth Day of April, 2004

JON W. DUDAS
*Acting Director of the United States Patent and Trademark Office*